US011264631B2

(12) United States Patent
Evans

(10) Patent No.: US 11,264,631 B2
(45) Date of Patent: *Mar. 1, 2022

(54) METHODS AND SYSTEM FOR MANUFACTURING A REDOX FLOW BATTERY SYSTEM BY ROLL-TO-ROLL PROCESSING

(71) Applicant: ESS TECH, INC., Wilsonville, OR (US)

(72) Inventor: Craig E. Evans, West Linn, OR (US)

(73) Assignee: ESS TECH, INC., Wilsonville, OR (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/536,216

(22) Filed: Aug. 8, 2019

(65) Prior Publication Data

US 2020/0052318 A1 Feb. 13, 2020

Related U.S. Application Data

(60) Provisional application No. 62/717,612, filed on Aug. 10, 2018.

(51) Int. Cl.
*H01M 8/18* (2006.01)
*H01M 50/46* (2021.01)
*H01M 4/66* (2006.01)
*H01M 8/0202* (2016.01)

(52) U.S. Cl.
CPC ........... *H01M 8/188* (2013.01); *H01M 4/663* (2013.01); *H01M 8/0202* (2013.01); *H01M 50/46* (2021.01)

(58) Field of Classification Search
CPC .................................................. H01M 8/0202
See application file for complete search history.

(56) References Cited

U.S. PATENT DOCUMENTS

| 4,547,443 | A | * | 10/1985 | Rowlette | H01M 4/64 429/217 |
| 5,665,212 | A | | 9/1997 | Zhong et al. | |
| 5,800,946 | A | * | 9/1998 | Grosvenor | H01M 4/66 429/210 |
| 9,614,244 | B2 | | 4/2017 | Evans et al. | |
| 9,685,651 | B2 | | 6/2017 | Evans et al. | |
| 9,748,564 | B2 | | 8/2017 | Hart et al. | |
| 9,865,895 | B2 | | 1/2018 | Evans et al. | |
| 2002/0064701 | A1 | * | 5/2002 | Hand | H01M 8/0213 429/518 |
| 2008/0220282 | A1 | * | 9/2008 | Jang | B32B 15/08 428/689 |

(Continued)

OTHER PUBLICATIONS

Kim, K. et al., "A technology review of electrodes and reaction mechanisms in vanadium redox flow batteries," Journal of Materials Chemistry A, vol. 3, No. 33, Jun. 9, 2015, 20 pages.

(Continued)

*Primary Examiner* — Brian R Ohara
(74) *Attorney, Agent, or Firm* — McCoy Russell LLP

(57) ABSTRACT

Methods and systems are provided for manufacturing a bipolar plate for a redox flow battery. In one example, the bipolar plate is fabricated by a roll-to-roll process. The bipolar plate includes a non-conductive substrate that is coupled to a negative electrode on a first surface and coupled to a positive electrode on a second surface, the first surface opposite of the second surface.

20 Claims, 12 Drawing Sheets

(56) References Cited

U.S. PATENT DOCUMENTS

| | | |
|---|---|---|
| 2016/0049673 A1 | 2/2016 | Fukushima et al. |
| 2016/0190604 A1 | 6/2016 | Evans et al. |
| 2017/0133720 A1 | 5/2017 | Kim et al. |
| 2017/0179516 A1 | 6/2017 | Evans et al. |
| 2017/0256803 A1 | 9/2017 | Evans et al. |
| 2018/0102556 A1* | 4/2018 | Puranam ............. H01M 8/0234 |
| 2019/0319292 A1* | 10/2019 | Warrington ......... H01M 8/2404 |

OTHER PUBLICATIONS

ISA Korean Intellectual Property Office, Written Opinion of the International Searching Authority Issued in Application No. PCT/US2019/045801, dated Nov. 26, 2019, WIPO, 6 pages.

ISA Korean Intellectual Property Office, International Search Report Issued in Application No. PCT/US2019/045801, dated Nov. 26, 2019, WIPO, 2 pages.

\* cited by examiner

METHODS AND SYSTEM FOR MANUFACTURING A REDOX FLOW BATTERY SYSTEM BY ROLL-TO-ROLL PROCESSING

CROSS REFERENCE TO RELATED APPLICATIONS

The present application claims priority to U.S. Provisional Application No. 62/717,612, entitled "Methods and System for Manufacturing a Redox Flow Battery System by Roll-to-Roll Processing", and filed on Aug. 10, 2018. The entire contents of the above-listed application are hereby incorporated by reference for all purposes.

FIELD

The present description relates generally to methods and systems for redox flow battery systems.

BACKGROUND AND SUMMARY

Redox flow batteries are suitable for grid scale storage applications due to capabilities for scaling power and capacity independently, as well as for charging and discharging over thousands of cycles with reduced performance losses in comparison to conventional battery technologies. A power module of a redox flow battery system may rely on one or more bipolar plates to perform multifaceted tasks. For example, bipolar plates may act as partitions between battery cells and as current conductors to decrease an internal resistance of the redox flow battery resulting from high electrical conductivity. Bipolar plates may facilitate water and thermal management and provide structural support within a redox flow battery stack. Of three primary categories (e.g., metallic, graphitic, and composite) of bipolar plates, composite bipolar plates may be particularly attractive.

Composite bipolar plates may be formed from a carbon-based polymer composite, exhibiting higher corrosion resistance than metallic bipolar plates and greater mechanical strength and processability than graphitic bipolar plates. Thus, improved durability and reduced costs may be achieved using composite bipolar plates in redox flow battery systems.

However, the inventors herein have recognized issues with the above systems. In one example, costs associated with raw materials and processing of the composite bipolar plates may be prohibitive from a marketing standpoint. Due to the repetitive implementation of the bipolar plates in a battery stack, the bipolar plates may contribute to 50% or more of the total cost of the redox flow battery power module. A batch process for manufacturing the composite bipolar plates, such as compression molding, involves expensive molding compounds and long processing times, both of which contribute to undesirably high manufacturing costs. Furthermore, any modifications made to the compression molding parameters during processes may further drive up a market price of the product.

In one example, the issues described above may be at least partially addressed by a method for fabricating a bipolar plate, comprising arranging a non-conductive substrate between a first roller and a second roller, moving the non-conductive substrate in a direction from the first roller towards the second roller, coupling a top surface of a non-conductive substrate with a first conductive material as the non-conductive substrate is moving, coupling a bottom surface of the non-conductive layer with a second material as the non-conductive substrate is moving, bonding the first conductive material and the second conductive material to the non-conductive layer and forming the bipolar plate, the non-conductive substrate sandwiched between the first conductive material and the second conductive material, as the non-conductive substrate is moving from the first roller to the second roller, and collecting the bipolar plate onto the second roller.

In this way, a redox flow battery system may be manufactured at lower cost and over a shorter duration of time. The bipolar plates, formed from a composite material, a metal, or carbon, may be fabricated via a roll-to-roll (R2R) process that allows the bipolar plates to be produced with high throughput in a cost-efficient manner. The R2R process includes fewer steps than conventional compression molding techniques, and thus larger quantities of the product may be generated at a faster rate. In addition, the R2R method may allow use of commercially available materials as components of the bipolar plates, thereby further reducing costs associated with processing time.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 12 is shown approximately to scale.

DETAILED DESCRIPTION

Figure 1:
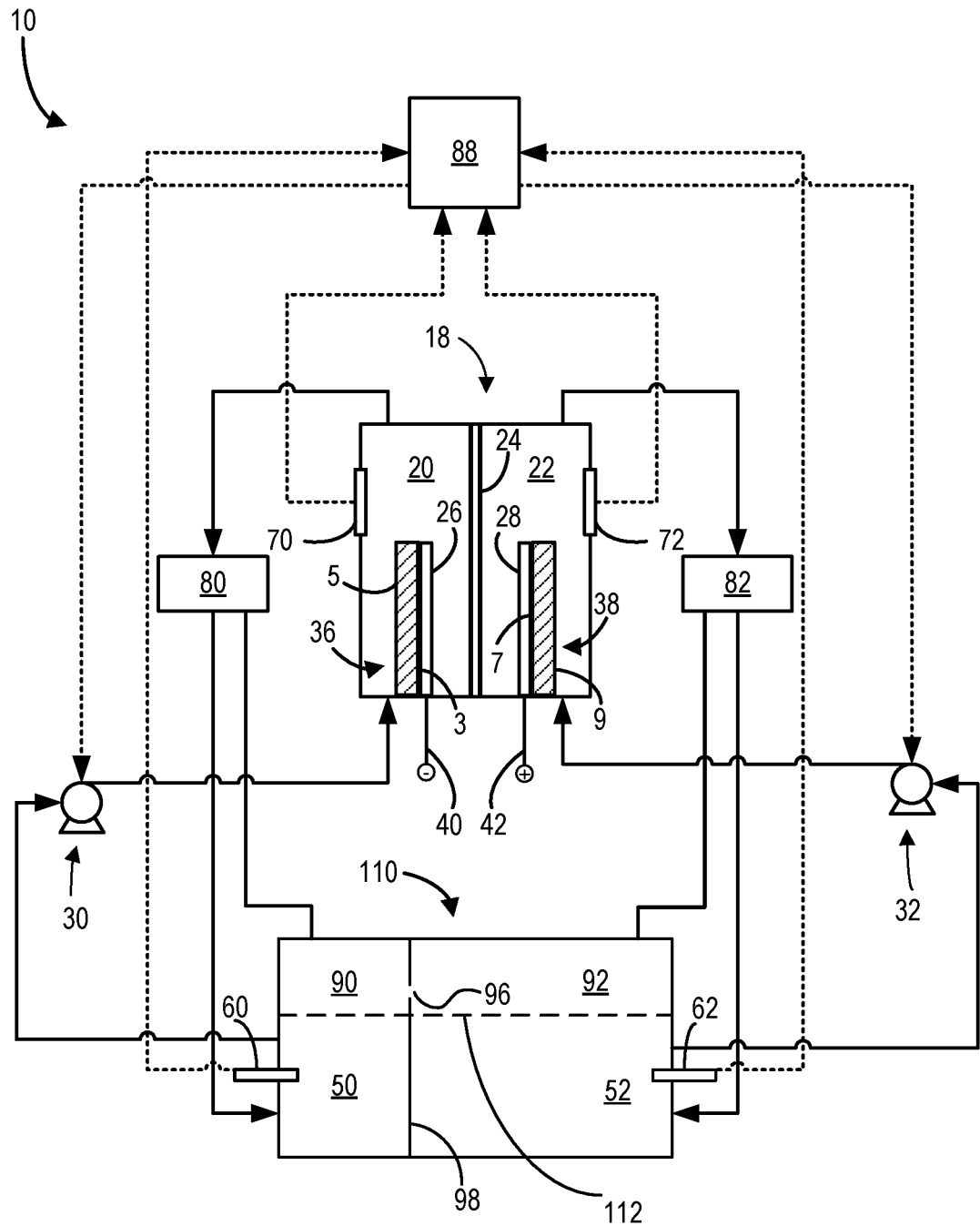
FIG. 1 shows a schematic of an example redox flow battery system that includes bipolar plates and a membrane separator.
Figure 4:
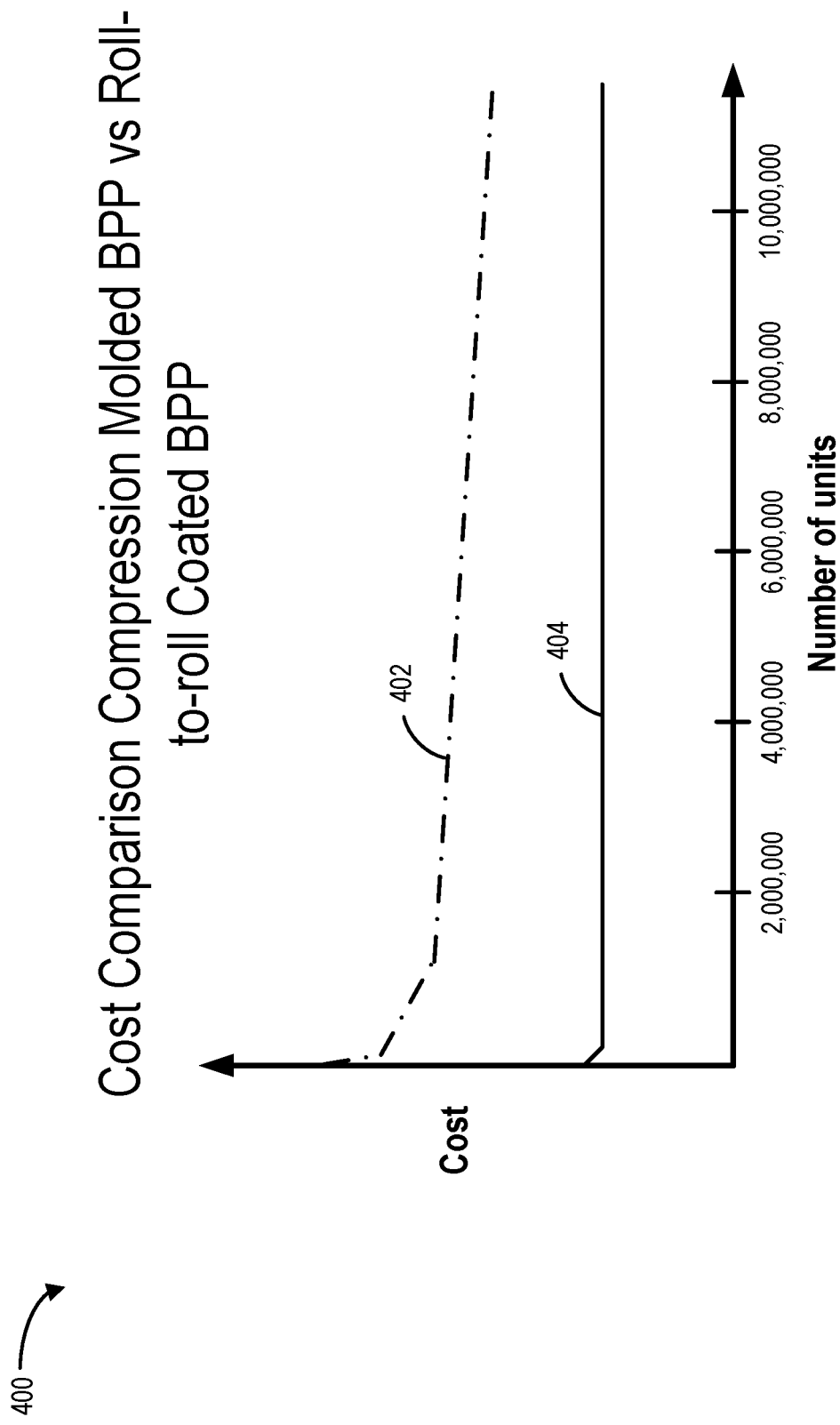
FIG. 4 shows a prophetic graph comparing production cost of manufacturing the bipolar plate by a molding method versus the roll-to-roll process.
Figure 5:
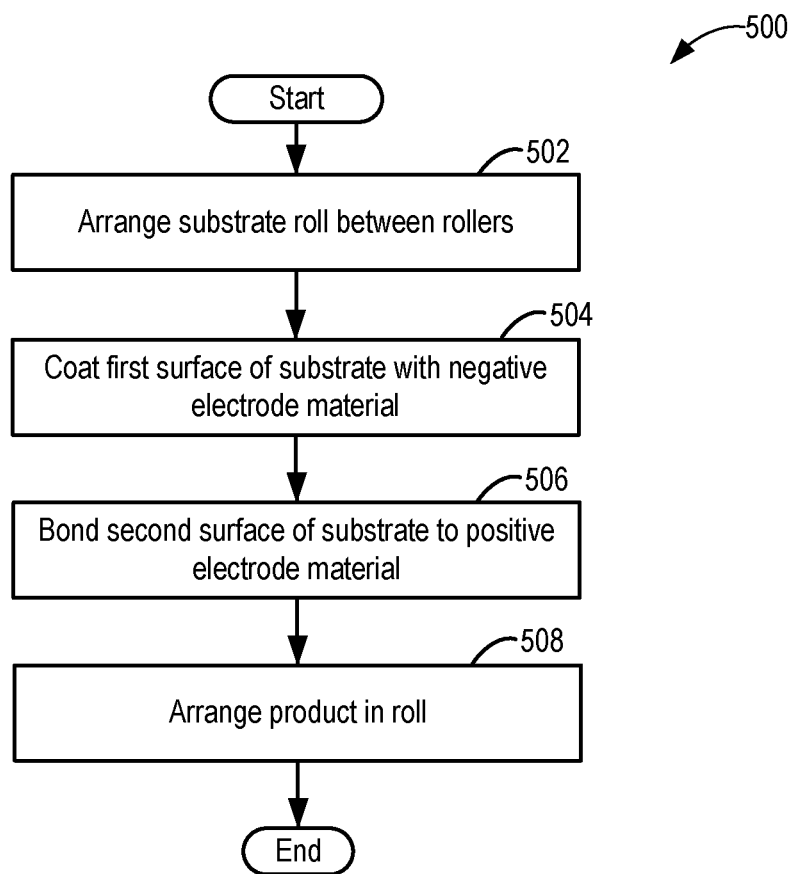
FIG. 5 shows a first example of a method for fabricating the bipolar plate.
Figure 6:
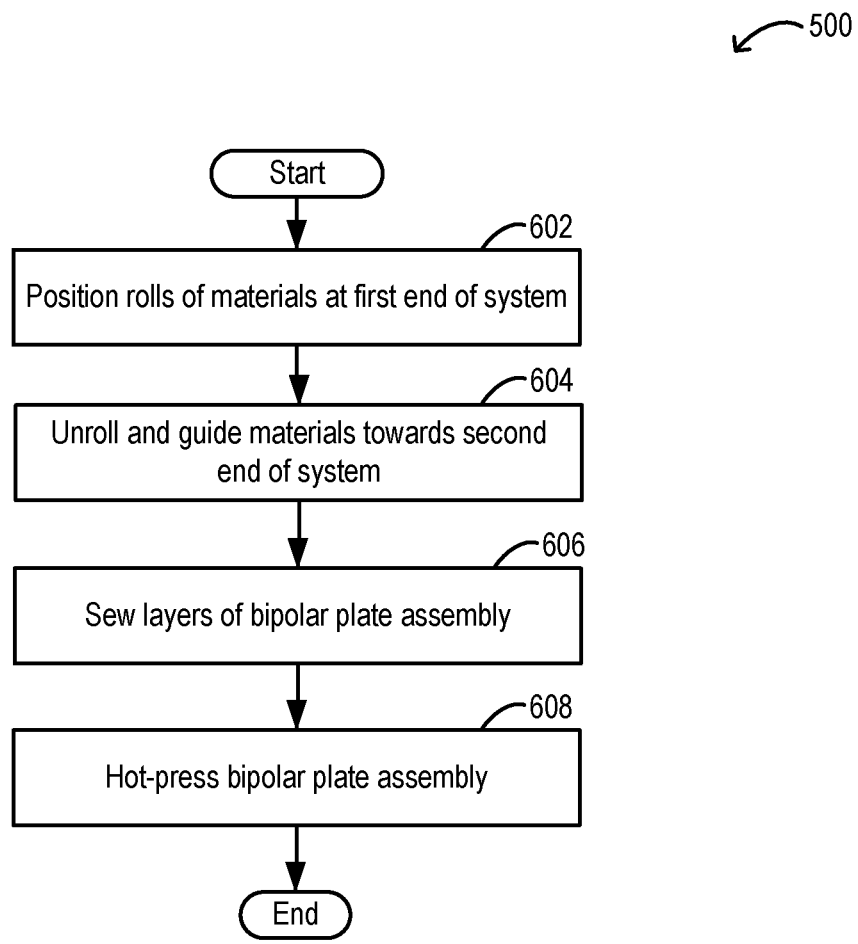
FIG. 6 shows a second example of a method for fabricating the bipolar plate.
Figure 7:
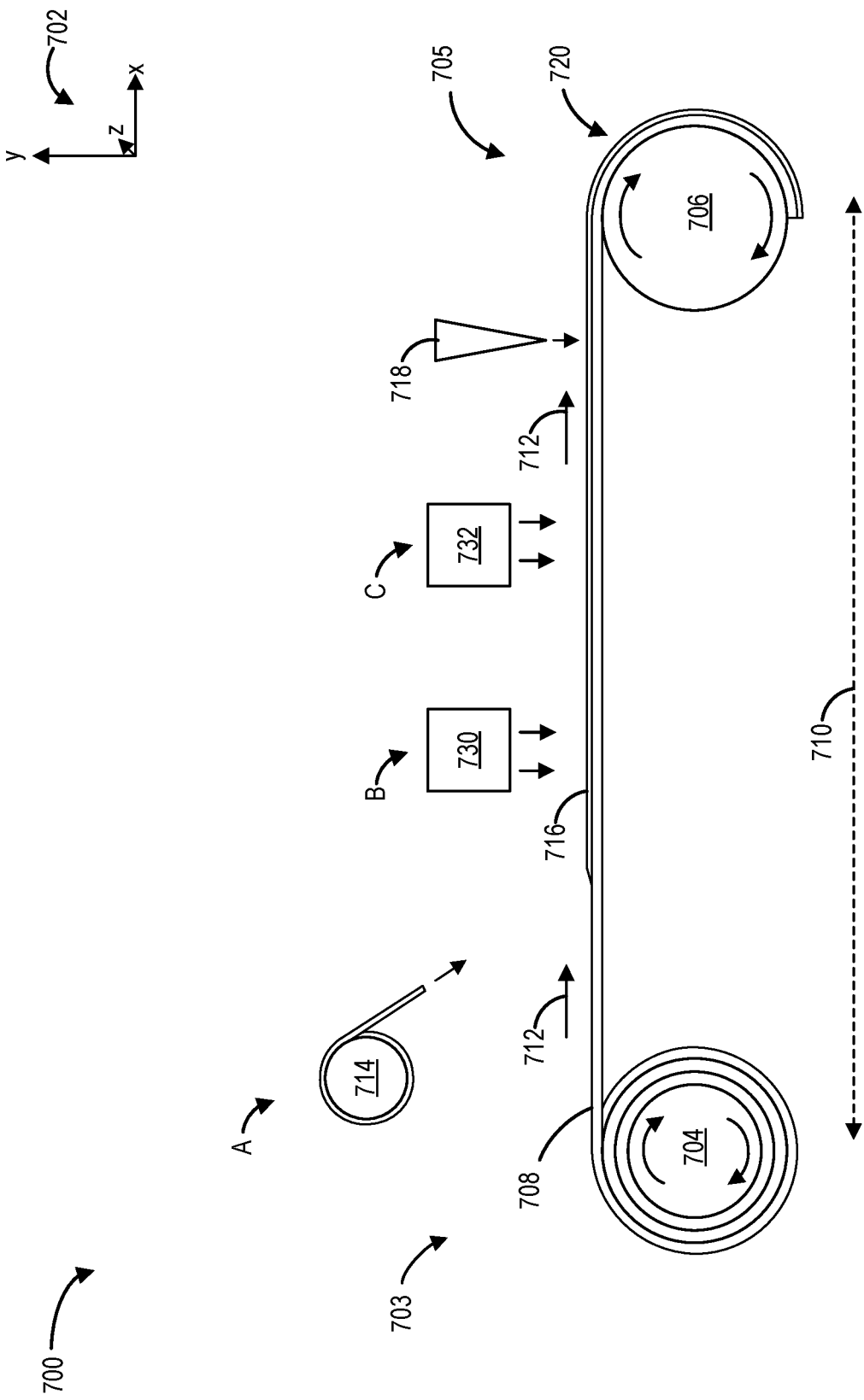
FIG. 7 shows a schematic diagram of an example of a roll-to-roll system.

The following description relates to systems and methods for manufacturing components of a redox flow battery. The redox flow battery is shown in FIG. 1 with an integrated multi-chamber tank having separate positive and negative electrolyte chambers. The electrolyte chambers may be coupled to one or more battery cells, each cell comprising a negative electrode and a positive electrode. The positive and negative electrolytes may be separated within each of the one or more battery cells by a bipolar plate configured to both connect and separate individual cells of the one or more battery cells to form a battery stack while maintaining a desired battery voltage, distribute fluids uniformly across active surfaces of the one or more battery cells, maintain electrical conductivity across the battery stack, etc. The positive and negative electrolytes may also be separated within each of the one or more battery cells by a membrane separator that selectively allows transport of ions across the separator to maintain charge balance across the battery cells. A series of steps for fabricating a bipolar plate by a roll-to-roll process is illustrated in a first flow diagram in FIG. 2. An alternative roll-to-roll process for fabricating the bipolar plate is shown in a second flow diagram in FIG. 3. The roll-to-roll processes of FIGS. 2 and 3 may result in a reduction of costs associated with raw materials and processing time. A prophetic graph showing unit cost of manufacturing the bipolar plate versus quantity of bipolar plates produced is depicted in FIG. 4. The graph includes a first plot representing fabrication of the bipolar plate by a batch method, such as compression molding, and a second plot depicting fabrication of the bipolar plate by the roll-to-roll process to provide an estimated difference in costs. FIGS. 5 and 6 show examples of methods for roll-to-roll production of the bipolar plate, corresponding to the processes described in FIGS. 2 and 3 respectively, as conducted on a system configured with rollers and a series of processing steps, commencing with an input roll of material and ending with an output roll of an assembled product. A schematic diagram of an example of a roll-to-roll system that may be used to manufacture the bipolar plate is shown in FIG. 7.

Figure 8:
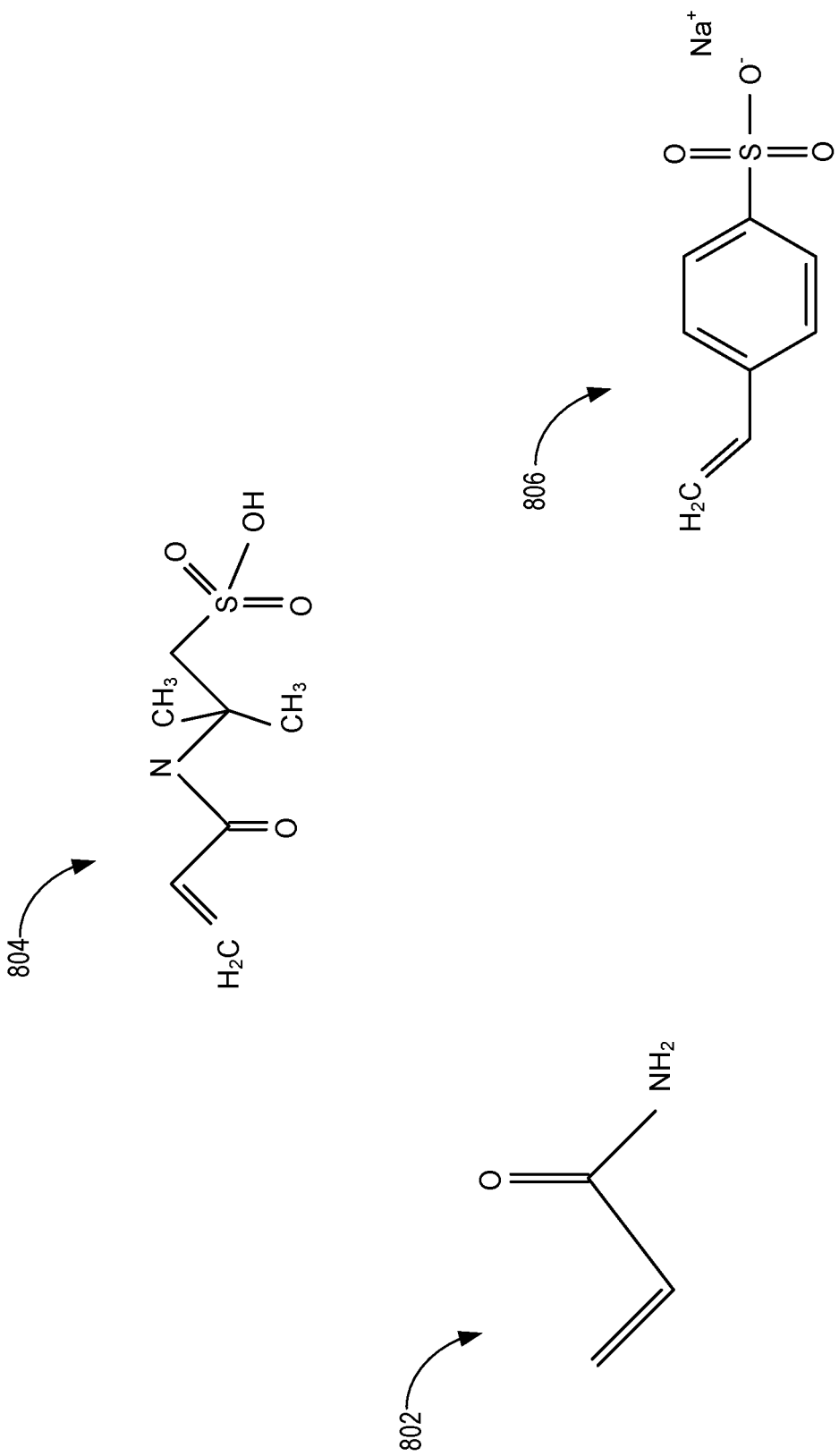
FIG. 8 shows examples of monomers that may be cross-linked to form polymers in pores of the membrane separator.
Figure 9:
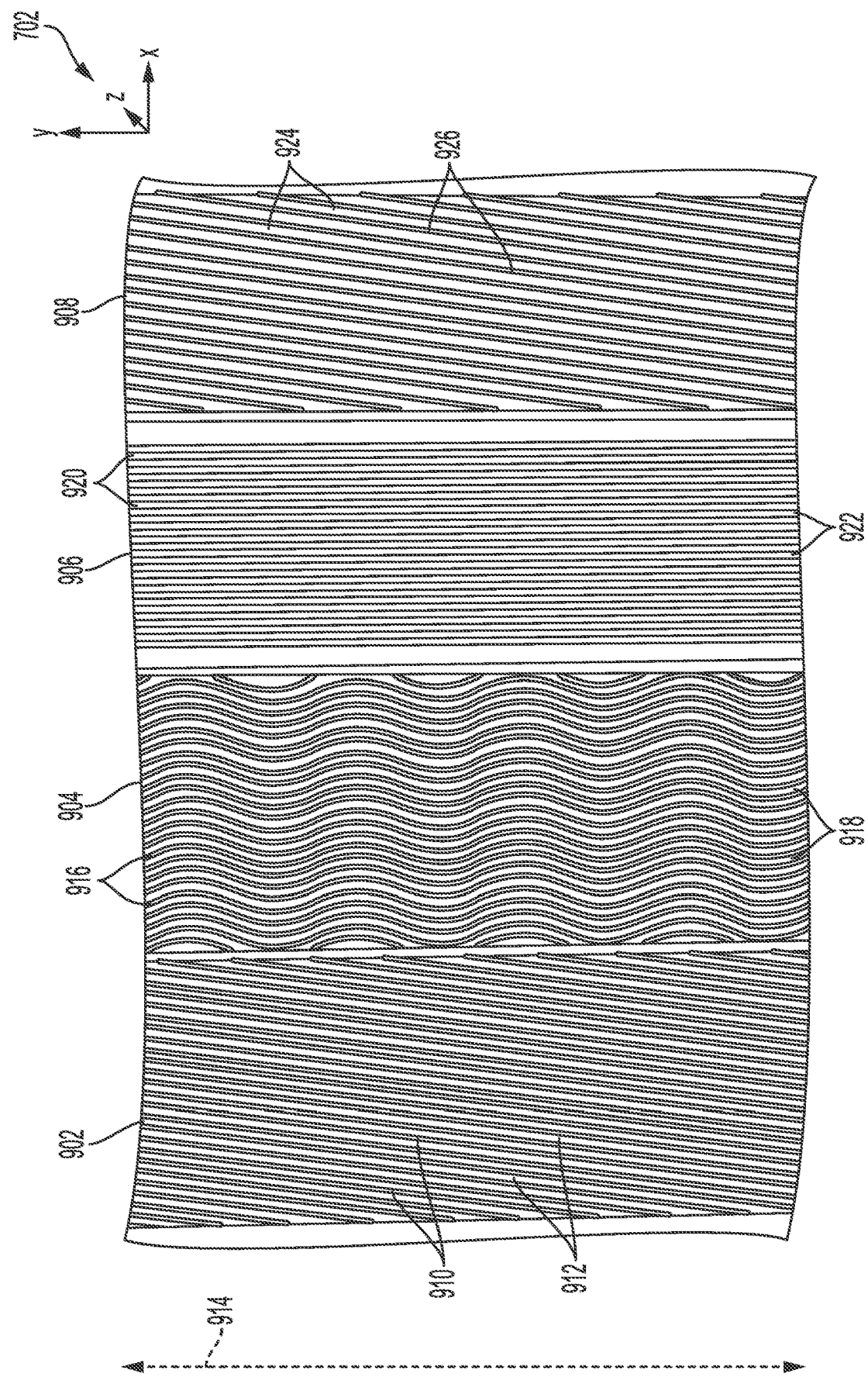
FIG. 9 shows examples of ribs that may be molded into the membrane separator to control a spacing between the separator and a negative electrode.
Figure 10:
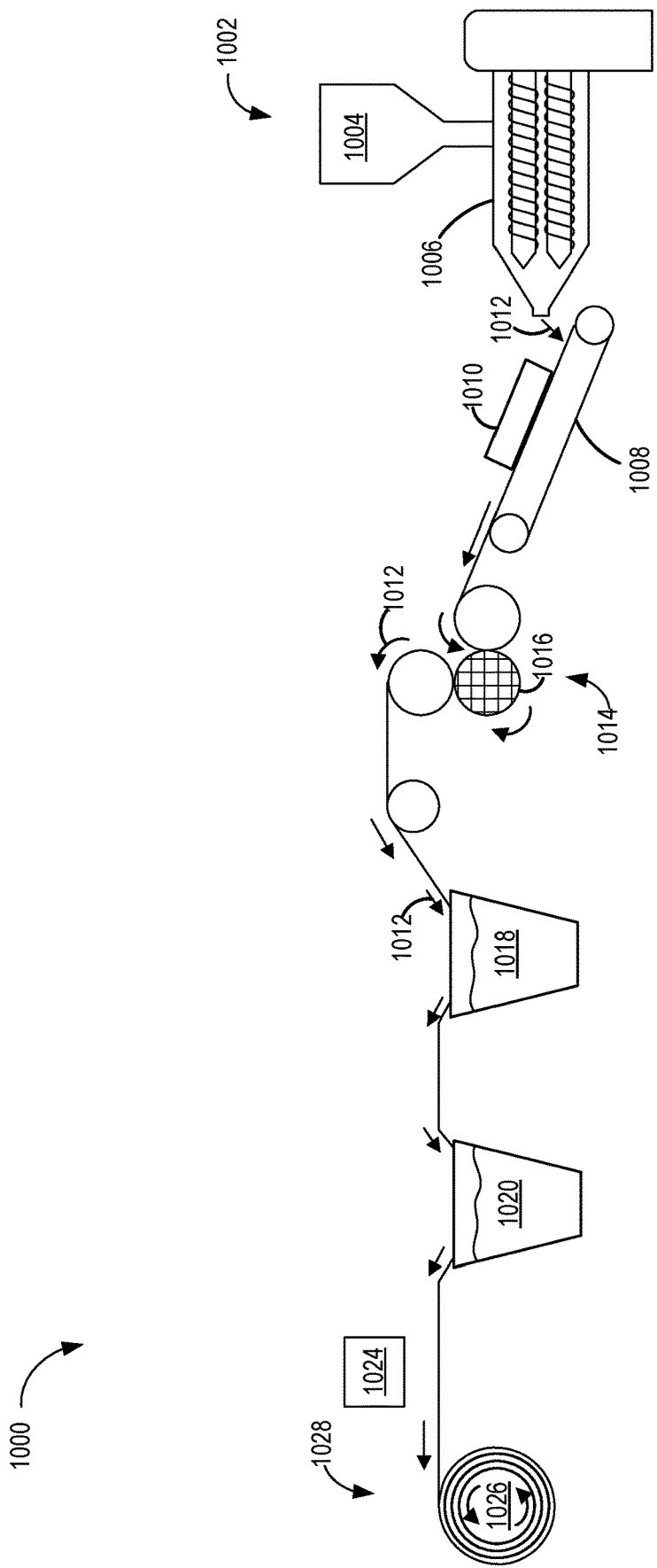
FIG. 10 shows a schematic diagram of an example of a calendering process for manufacturing the membrane separator with an integrated spacer.
Figure 11:
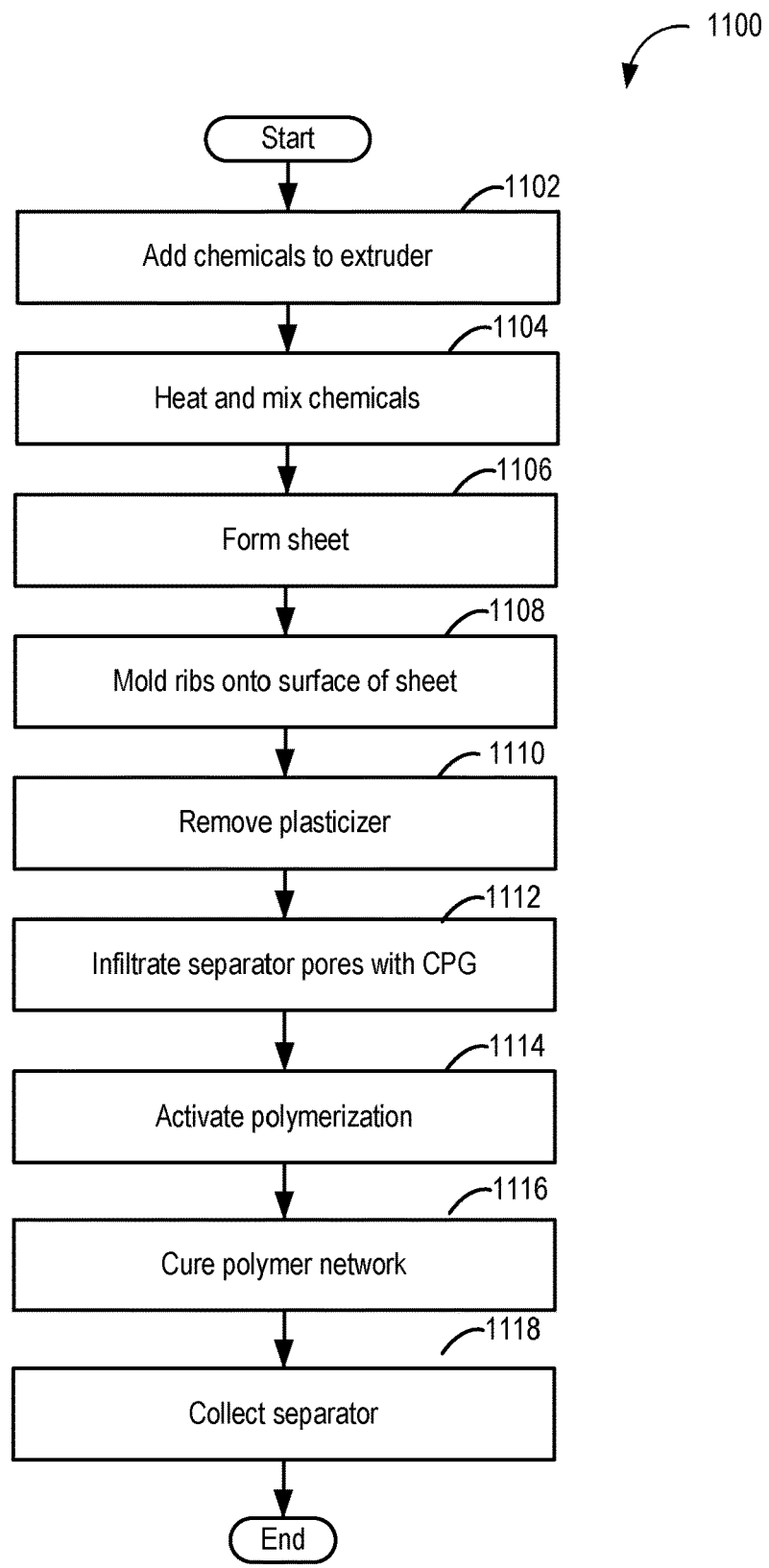
FIG. 11 shows an example of a method for fabricating the membrane separator with molded ribs by the calendering process.
Figure 12:
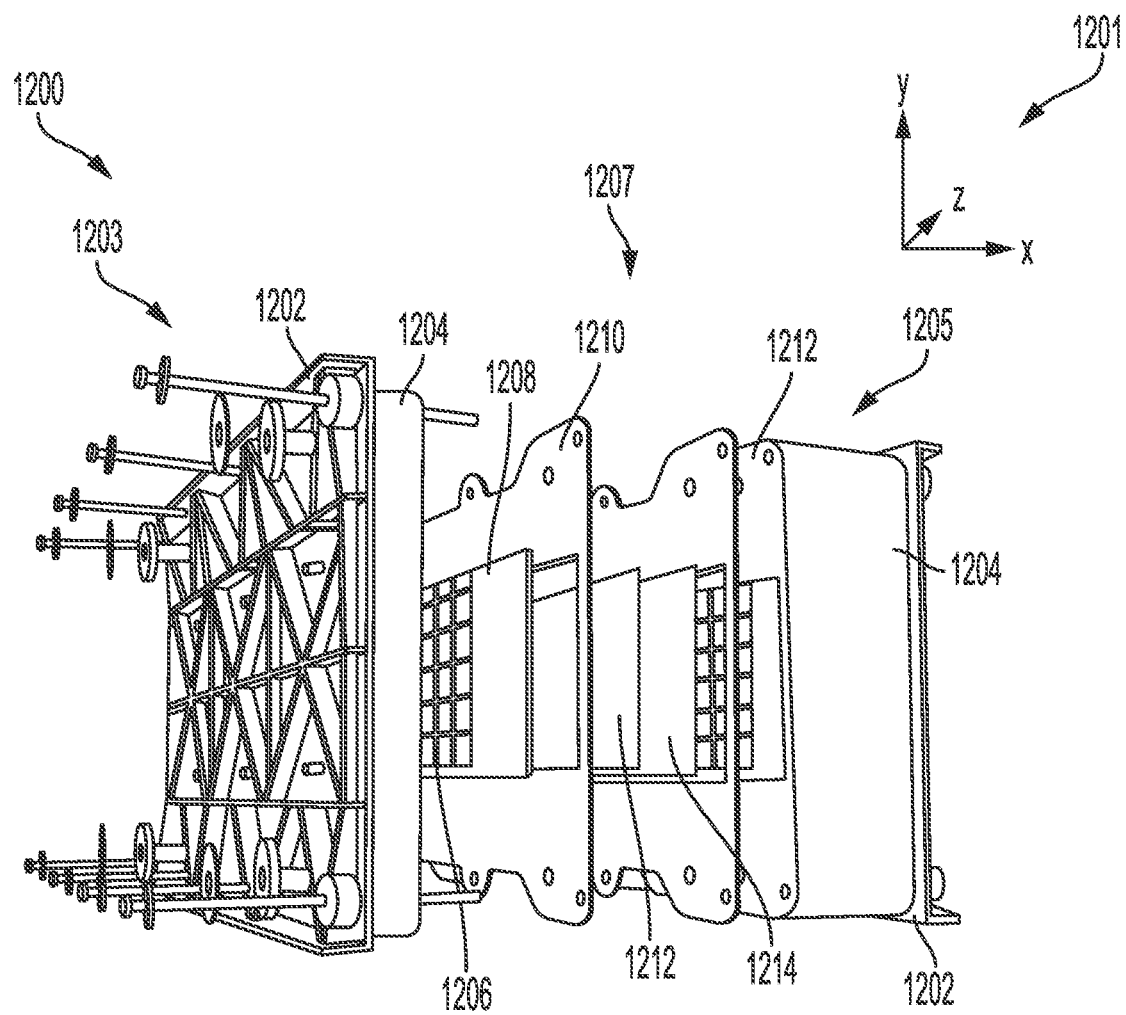
FIG. 12 shows an example of a power module of the redox flow battery.

The redox flow battery may also include a separator positioned between the positive and negative electrodes. The separator may be formed from a number of components, including a cross-linked polymer with functional groups that provide ion selectivity when the cross-linked polymer is integrated into pores of a base structure of the separator. Examples of functional groups of the cross-linked polymer that may allow selective ion transport are depicted in FIG. 8. In addition to separating positive and negative electrolytes and controlling flow of ions therebetween, the separator may be adapted with a geometry that affects a spacing between the separator and the negative electrode as well as interaction of negative electrolyte with the negative electrode. For example, the separator may be molded, as shown in FIG. 9, with a plurality of ribs on a side of the separator in contact with negative electrolyte, directing flow along a surface of the negative electrode and channeling bubbles of hydrogen gas, formed during operation of the redox flow battery system, away from the electrode surface. Fabrication of the separator, with molded ribs, may be achieved by a roll-to-roll calendering process. An example of a calendering system that may be used to produce the separator is shown in a schematic diagram in FIG. 10. An example of a method for fabricating the separator with the integrated cross-linked polymer and molded ribs by the roll-to-roll calendaring process is shown in FIG. 11, which may allow for cost-effective manufacturing of the separator with high throughput and increased battery performance. The redox flow battery system may include a power module that contains the bipolar plate, negative spacer, positive and negative electrodes, membrane separator and positive and negative electrolytes as repeating units. An example of the power module is depicted in FIG. 12.

FIGS. 2, 3, 7, 10, and 12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Hybrid redox flow batteries are redox flow batteries that are characterized by the deposit of one or more electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., a maximum amount of energy stored) of the redox battery may be limited by the amount of metal plated during battery charge and may accordingly depend on the efficiency of the plating system as well as the available volume and surface area available for plating.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a battery cell 18 may be referred to as a plating electrolyte, and a positive electrolyte on a redox side (e.g. a positive electrode compartment 22) of the battery cell 18 may be referred to as a redox electrolyte.

Anode refers to the electrode where electro-active material loses electrons, and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Alternatively, during discharge, the negative electrolyte and negative electrode may be respectively referred to as an anolyte and anode of the electrochemical reaction, while the positive electrolyte and the positive electrode may be respectively referred to as a catholyte and cathode of the electrochemical reaction. In contrast, during charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode 26, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge, $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

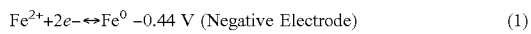

$$Fe^{2+}+2e- \leftrightarrow Fe^0 \; -0.44 \text{ V (Negative Electrode)} \quad (1)$$

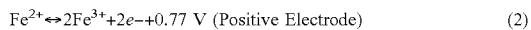

$$Fe^{2+} \leftrightarrow 2Fe^{3+}+2e- +0.77 \text{ V (Positive Electrode)} \quad (2)$$

As discussed above, the negative electrolyte used in the all iron redox flow battery may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$, and may be dissolved back into the electrolyte. The equilibrium potential of the above reaction is $-0.44$ V and thus, this reaction provides a negative terminal for the desired system. On the positive side of the IFB, the electrolyte may provide $Fe^{2+}$ during charge, which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is $+0.77$ V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode 26 may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate, causing it to plate onto the negative electrode 26.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as an external positive electrolyte tank 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte chamber 50 to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through a separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, adding to process cost and complexity. Adding specific organic acids to the positive electrolyte and the negative electrolyte in response to electrolyte pH changes may also mitigate precipitate formation during battery charge and discharge cycling.

Additional coulombic efficiency losses may be caused by reduction of $H^+$ (e.g., protons) and subsequent formation of $H_2$ (e.g., hydrogen gas) and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

Continuing with FIG. 1, a schematic illustration of the redox flow battery system 10 is shown. The redox flow battery system 10 may comprise the redox flow battery cell 18 fluidly connected to a multi-chambered electrolyte storage tank 110. The redox flow battery cell 18 may generally include the negative electrode compartment 20, separator 24, and positive electrode compartment 22. The separator 24 may comprise an electrically insulating ionic conducting barrier which prevents bulk mixing of the positive electrolyte and the negative electrolyte while allowing conductance of specific ions therethrough. For example, the separator 24 may comprise an ion-exchange membrane and/or a microporous membrane.

In some examples, the separator 24 may include a base membrane material acting as a microporous framework for the separator 24. The base membrane may be an ultrahigh molecular weight polyethylene (UHMWPE) that lends mechanical strength to the separator 24. Silica may be precipitated onto the UHMWPE to provide porosity and wettability. The separator 24 may also include a gel that, when applied to the membrane in a solution, may be polymerized and cross-linked within pores of the membrane to form a resin. The resulting resin, derived from the cross-linked polymer gel (CPG), may be adapted to selectively transport ions across the membrane via an ion-exchange mechanism. Furthermore, the separator 24 may be configured to have ribs molded into a surface of the separator 24 in contact with the negative electrolyte. The ribs may be used in place of a negative spacer that defines a distance between the separator 24 and the negative electrode 26 as well as flow patterns of the negative electrolyte across the negative electrode 26. Descriptions of a synthetic protocol, identities of functional groups of the CPG, and geometries of the ribs are provided further below with respect to FIGS. 8-12.

The negative electrode compartment 20 may comprise the negative electrode 26 and the negative electrolyte comprising electroactive materials. The positive electrode compartment 22 may comprise the positive electrode 28 and the positive electrolyte comprising electroactive materials. In some examples, multiple redox flow battery cells 18 may be combined in series or parallel to generate a higher voltage or current in a redox flow battery system. Further illustrated in FIG. 1 are negative and positive electrolyte pumps 30 and 32, both used to pump electrolyte solution through the flow battery system 10. Electrolytes are stored in one or more tanks external to the cell and are pumped via negative and positive electrolyte pumps 30 and 32 through the negative electrode compartment 20 side and the positive electrode compartment 22 side of the battery, respectively.

The redox flow battery system 10 may also include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26, and the second bipolar plate 38 may be in contact with the positive electrode 28. In other examples, however, the bipolar plates may be arranged proximate but spaced away from the electrodes. The IFB electrolytes may be transported to reaction sites at the negative and positive electrodes 26 and 28 by the first and second bipolar plates 36 and 38, resulting from conductive properties of a material of the bipolar plates 36, 38. Electrolyte flow may also be assisted by the negative and positive electrolyte pumps 30 and 32, facilitating forced convection through the redox flow battery cell 18. Reacted electrochemical species may also be directed away from the reaction sites by the combination of forced convection and the presence of the first and second bipolar plates 36 and 38.

The first and second bipolar plates 36 and 38 may each include an electrically insulated component, which aids in reducing shunt currents generated in the electrolyte, and an electrically conductive component. The electrically conductive component allows the bipolar plates 36, 38 to electrically connect cells within a stack of redox flow battery cells. Furthermore, each of the bipolar plates in the cell stack may have a positive side and a negative side and, in some examples, may be adapted on the positive side with flow channels for positive electrolyte and flow channels on the negative side for negative electrolyte. For example, the cell stack may include more than one of the redox flow battery cell 18 shown in FIG. 1, the more than one redox flow battery cells stacked linearly. In such a configuration, the first bipolar plate 36 of the redox flow battery cell 18 may be arranged with a negative side 3 facing the rear side of the negative electrode 26 and a positive side 5 of the first bipolar plate 36, the positive side opposite of the negative side, facing a rear side of a positive electrode of an adjacent redox flow battery cell (not shown) positioned on the left-hand side of redox flow battery cell 18. Similarly, the second bipolar plate 38, with a positive side 7 facing the rear side of the positive electrode 28, may have a negative side 9 facing a rear side of a negative electrode of another adjacent redox flow battery cell (not shown), the adjacent cell positioned at the right-hand side of redox flow battery cell 18.

A plurality of bipolar plates within the cell stack may be electrically connected to provide a continuous conductive path along the cell stack, channeling current produced from each cell to current collectors arranged at ends of the cell stack. The first and second bipolar plates 36, 38 in redox flow battery cell 18 may have a variety of additional roles including supporting a cell stack structure, separating positive electrolyte and negative electrolyte, and increasing performance of the redox flow battery system 10 by decreasing formation of shunt currents in the IFB electrolyte. Details of the material from which the bipolar plates may be formed and methods of fabrication are described further below, with respect to FIGS. 2-7.

As illustrated in FIG. 1, the redox flow battery cell 18 may further include negative battery terminal 40 and positive battery terminal 42. When a charge current is applied to the battery terminals 40 and 42, the positive electrolyte is oxidized (loses one or more electrons) at the positive electrode 28, and the negative electrolyte is reduced (gains one or more electrons) at the negative electrode 26. During battery discharge, reverse redox reactions occur on the electrodes. In other words, the positive electrolyte is reduced (gains one or more electrons) at the positive electrode 28, and the negative electrolyte is oxidized (loses one or more electrons) at the negative electrode 26. The electrical potential difference across the battery is maintained by the electrochemical redox reactions in the positive electrode compartment 22 and the negative electrode compartment 20 and may induce a current through a conductor while the reactions are sustained. The amount of energy stored by a redox battery is limited by the amount of electro-active material available in electrolytes for discharge, depending on the total volume of electrolytes and the solubility of the electro-active materials.

The flow battery system 10 may further comprise the integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. The figure further illustrates the fill height 112 of storage tank 110, which may indicate the liquid level in each tank compartment. The figure also shows gas head space 90 located above the fill height 112 of negative electrolyte chamber 50 and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. A such, the stored hydrogen gas may aid in purging other gases from the multi-chamber storage tank 100, thereby acting as an inert gas blanket for reducing oxidation of electrolyte species, which may help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system, reducing the physical footprint of the system, and reducing system costs.

FIG. 1 also shows the spill-over hole 96, which creates an opening in the bulkhead 98 between gas head spaces 90 and 92, and provides a means of equalizing gas pressure between the two chambers. The spill-over hole 96 may be positioned a threshold height above the fill height 112. The spill-over hole 96 further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank can include at least one outlet from each of the negative and positive electrolyte chambers and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber 52 includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber 52 independently or together. For example, in response to an electrolyte temperature decreasing below a threshold temperature, the controller may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples, the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers 50, 52 in response to a liquid level decreasing below a solids fill threshold level. Said in another way, controller 88 may activate the one or more heaters in the negative and positive electrolyte chambers 50, 52 only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further still, one or more inlet connections may be provided to each of the negative and positive electrolyte chambers 50, 52 from a field hydration system (not shown). In this way, the field hydration system can facilitate commissioning of the redox flow battery system, including installing, filling, and hydrating the system, at an end-use location. Furthermore, prior to its commissioning at the end-use location, the redox flow battery system may be dry-assembled at a battery manufacturing facility different from end-use location without filling and hydrating the system, before delivering the system to the end-use location. In one example, the end-use location may correspond to the location where the redox flow battery system 10 is to be installed and utilized for on-site energy storage. Said in another way, it is anticipated that, once installed and hydrated at the end-use location, a position of the redox flow battery system 10 becomes fixed, and the redox flow battery system 10 is no longer deemed a portable, dry system. Thus, from the perspective of a redox flow battery system end-user, the dry portable redox flow battery system 10 may be delivered on-site, after which the redox flow battery system 10 is installed, hydrated and commissioned. Prior to hydration the redox flow battery system 10 may be referred to as a dry, portable system, the redox flow battery system 10 being free of or without water and wet electrolyte. Once hydrated, the redox flow battery system 10 may be referred to as a wet non-portable system, the redox flow battery system 10 including wet electrolyte.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82 may be connected in-line or in parallel with the recirculating flow paths of the electrolyte at the negative and positive sides of the battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence of a packed catalyst bed.

During operation of the redox flow battery system 10, sensors and probes may monitor and control chemical properties of the electrolyte such as electrolyte pH, concentration, state of charge, and the like. For example, as illustrated in FIG. 1, sensors 62 and 60 may be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. Sensors may be positioned at other locations throughout the redox flow battery system 10 to monitor electrolyte chemical properties and other properties. For example, a sensor may be positioned in an external acid tank (not shown) to monitor acid volume or pH of the external acid tank, wherein acid from the external acid tank is supplied via an external pump (not shown) to the redox flow battery system 10 in order to reduce precipitate formation in the electrolytes. Additional external tanks and sensors may be installed for supplying other additives to the redox flow battery system 10. For example, various sensors, including temperature, conductivity, and level sensors of a field hydration system may transmit signals to the controller 88. Furthermore, controller 88 may send signals to actuators such as valves and pumps of the field hydration system during hydration of the redox flow battery system 10. Sensor information may be transmitted to controller 88, which may in turn actuate pumps 30 and 32 to control electrolyte flow through the cell 18 or to perform other control functions, as an example. In this manner, the controller 88 may be responsive to one or a combination of sensors and probes.

Redox flow battery system 10 may further comprise a source of hydrogen gas. In one example, the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110. The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species. For example, an increase in pH of the negative electrolyte chamber 50, or the negative electrode compartment 20, may indicate that hydrogen is leaking from the redox flow battery system 10 and/or that the reaction rate is too slow with the available hydrogen partial pressure, and controller 88, in response to the pH increase, may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by proton generated at the positive side crossing over to the negative electrolyte due to a proton concentration gradient and electrophoretic forces. In this manner, the pH of the negative electrolyte may be maintained within a stable region while reducing the risk of precipitation of ferric ions (crossing over from the positive electrode compartment) as $Fe(OH)_3$. Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system 10. For example the time period may be reduced if the recirculation rate is high, and local changes in concentration (e.g., due to side reactions or gas leaks) may quickly be measured since the time constants may be small.

An IFB system, e.g., the flow battery system 10 of FIG. 1, may include a power module adapted with a bipolar plate adapted with an integrated negative electrode, described further below with reference to FIGS. 2, 3, and 5-7. A negative spacer, defining a spacing between the negative electrode and adjacent components and moderating flow paths along the negative electrode, may be positioned between the negative electrode and the adjacent components. In some examples, the negative spacer may be directly molded, as shown in FIGS. 9 and 10, into a surface of a membrane separator that separates positive electrolyte from negative electrolyte. An example of a power module 1200 that may be used in a redox flow battery system, such as the redox flow battery system 10 of FIG. 1, is shown in FIG. 12. A set of reference axis 1201 is provided, indicating a y-axis, an x-axis, and a z-axis. The power module 1200 comprises a series of components arranged as layers within the power module 1200. The layers may be positioned co-planar with the y-x plane and stacked along the z-axis.

Pressure plates 1202 may be arranged at a first end 1203 and a second end 1205 of the power module 1200 that provide rigid end walls that define boundaries of the power module 1200. The pressure plates 1202 allow layers of the power module 1200 to be pressed together between the pressure plates 1202 to seal components of the power module within an interior 1207 of the power module 1200. Picture frames 1204 may be arranged inside of the pressure plates 1202, e.g., against a side facing the interior 1207 of each of the pressure plates of the power module 1200, the picture frames 1204 adapted to interface with one another to seal fluids within the interior 1207 of the power module 1200.

Elements of the power module 1200 are now described along a direction from the first end 1203 towards the second end 1205. A negative spacer 1206 is arranged adjacent to one of the picture frames that is proximate to the first end 1203, the negative spacer 1206 defining flow channels along a surface of a negative electrode that may be integrated into a surface of a bipolar plate 1208 that is facing the negative spacer 1206. In some examples, the negative spacer 1206 may be directly molded into a surface of a membrane separator 1214 as a plurality of ribs along a surface of the membrane 1214 that is in face-sharing contact with the negative electrode and on an opposite side of the membrane separator 1214 from a positive electrode 416.

The bipolar plate 1208 may be the first or second bipolar plate 36 or 38 of FIG. 1 and, in one example, may have the negative electrode integrated into the surface of the bipolar plate 1208 in face-sharing contact with the negative spacer 1206. The bipolar plate 1208 is positioned between the negative spacer 1206 and surrounded by a bipolar plate frame plate 1210 that provides structural support.

The positive electrode 1212 is arranged adjacent to a side of the bipolar plate 1208 that is opposite of the negative spacer 1206. The membrane separator 1214, surrounded by a membrane frame plate 1216 for structural support, may be positioned adjacent to the positive electrode 1212, towards the second end 1205 of the power module 1200. The components described above, e.g., the negative spacer 1206, the bipolar plate 1208, the positive electrode 1212, and the membrane separator 1214 may repeat within the power module, from the first end 1203 to the second end 1205, a number of times, thereby forming a battery stack. Negative electrolyte may be contained between another membrane separator that is arranged on the side of the bipolar plate 1208 facing the first end 1203 of the power module 1200, with the negative electrolyte in contact with both the negative spacer 1206 and integrated negative electrode (e.g., integrated into the surface of the bipolar plate 1208). Positive electrolyte may be contained between the bipolar plate 1208 and the membrane separator 1214, in contact with the positive electrode 1212.

Within a power module, a bipolar plate may be arranged between a negative electrode and a positive electrode and configured to interact with both negative and positive electrolytes. A membrane separator, e.g., the separator 24 of FIG. 1 and the membrane separator 1214 of FIG. 12, may be also be included in the stack, similarly positioned between the positive and negative electrode on opposite sides of the positive and negative electrode from the bipolar plate. Both the bipolar plate and membrane separator may be repeating components in the IFB system that contribute significantly to system costs. By manufacturing the bipolar plate and membrane separator by cost-efficient, automated processes, production expenses may be greatly reduced.

In one example, the bipolar plate may be integrated with the negative and positive electrodes into a unified, continuous structure that may be manufactured by a roll-to-roll (R2R) process. As such, the bipolar plate has a negative side that is adapted for iron plating according to equation (1) above and a positive side that engages with positive electrolyte to facilitate the reaction of equation (2). Fabricating the bipolar plate with the negative and positive electrodes incorporated into the structure may simplify the production of IFB components and reduce costs significantly. In addition, the R2R process does not involve curing of materials, thereby decreasing processing time as compared to molding methods. Furthermore, using the R2R process allows for continuous, large-scale production of the bipolar plate using a commercially available carbon fiber as a base which may be optimized for cohesion with materials forming the negative and position electrodes.

An example of a R2R system 700 that may be used to manufacture a bipolar plate is shown in a schematic diagram in FIG. 7. A reference axis 702 is provided, indicating a y-axis, an x-axis, and a z-axis. In one example, the y-axis may be aligned with a vertical direction, the x-axis with a horizontal direction, and the z-axis with a lateral direction. The R2R system 700 may include a first roller 704 at a first end 703 of the R2R system 700 and a second roller 706 at a second end 705 of the R2R system 700, the first roller 704 and the second roller 706 spaced apart and aligned along the horizontal direction. The first roller 704 is a support for a flexible substrate 708, the flexible substrate 708 rolled around the first roller 704 and extending horizontally from the first roller 704 to the second roller 706. The substrate 708 may be moving, with the first roller 704 and second roller 706 rotating clockwise, across a distance 710 from the first roller 704 towards the second roller 706, as indicated by arrows 712. As the substrate 708 travels, the substrate 708 is unrolled from the first roller 704 and reeled onto the second roller 706.

As the substrate 708 travels across the distance 710, a series of processes may be applied to the substrate 708. For example, at first step A, a rolled sheet of a material 714 may be unreeled and added to a top surface, with respect to the y-axis, of the substrate 708. The material 714 may form an upper layer 716 of a final product 720 of the R2R system 700, adapted with desired properties such as, for example, electrical conductivity. Additionally processing steps may occur along a path of travel of the substrate 708. As one example, a substance may be sprayed or printed onto the top surface of the substrate 708 by a first device 730 at a second step B. At a third step C, the substrate 708 may be pressed or heated to bond the substrate 708 to the upper layer 716 at a second device 732. Furthermore, similar treatments may be applied to a bottom surface (not shown in FIG. 7), with respect to the y-axis, of the substrate 708 or a roll of another material may be unreeled and coupled to the bottom surface of the substrate 708. It will be appreciated that the first, second and third steps A, B, and C, shown in FIG. 7 and associated processes described above are non-limiting examples of treatment steps that may be included in the R2R system 700. Various combinations of steps, other treatment processes not included above, and number of processing steps may be applied without departing from the scope of the present disclosure.

The R2R system may also include a cutting tool 718 along the distance 710 between the first roller 704 and second roller 706 and positioned proximate to the second roller 706. The cutting tool 718 may be applied to the substrate 708 and bonded upper layer 716 (together forming the R2R product 720), as well as any other layers added to the substrate 708, to cut through the R2R product 720. The R2R product 720, may then be stored as a roll on the second roller 706 and unrolled and cut to desired geometries.

Figure 2:
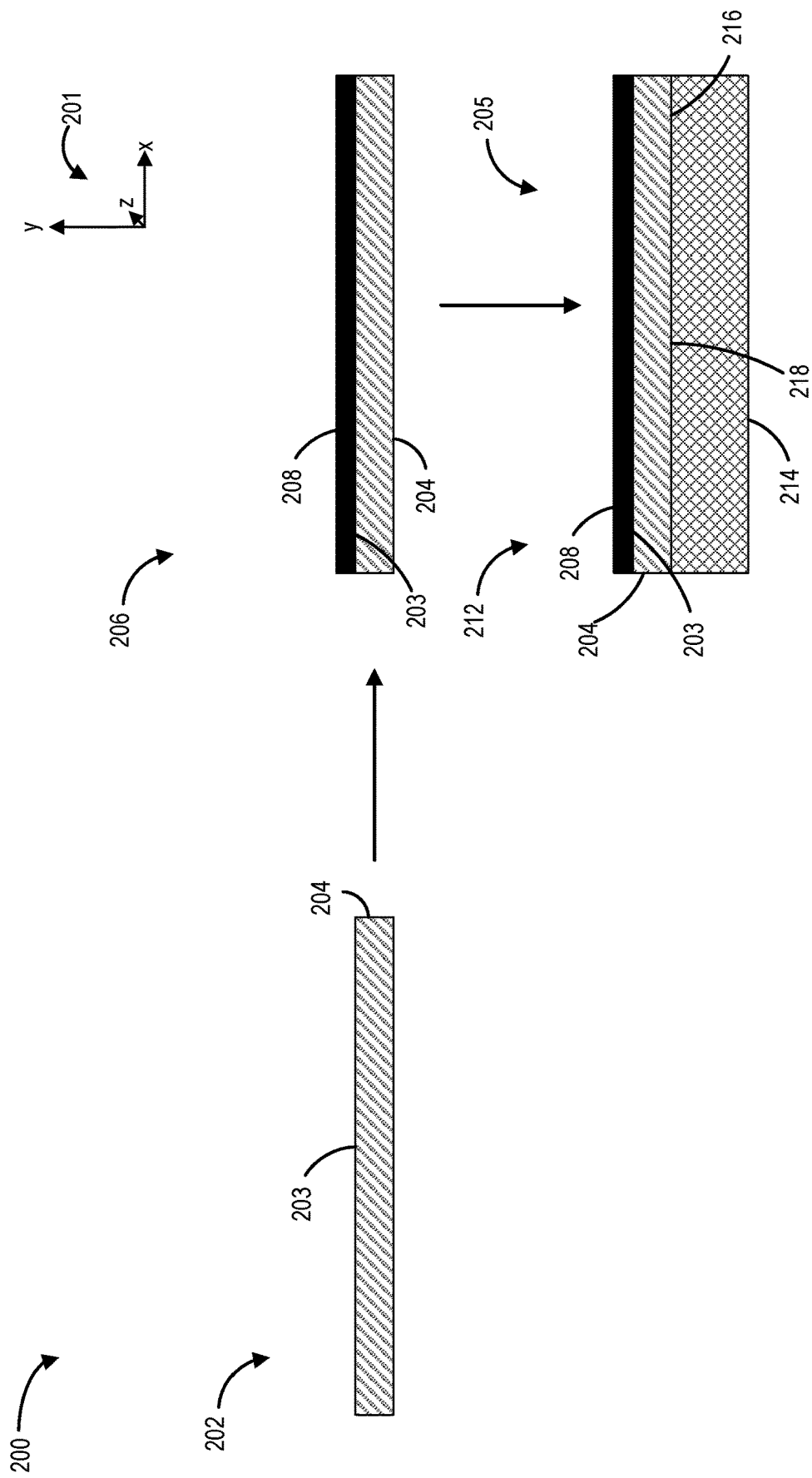
FIG. 2 shows a flow diagram of a first example of a roll-to-roll process for manufacturing a bipolar plate for the redox flow battery system.

A first example of a R2R process for manufacturing a continuous, carbon fiber-reinforced composite bipolar plate 205 is depicted in a flow diagram 200 in FIG. 2. A set of references axes 201 are provided in FIGS. 2 and 3, indicating a y-axis, an x-axis, and a z-axis. The R2R process may be conducted on a R2R system, such as the R2R system 700 of FIG. 7. As one example, the bipolar plate 205 may be assembled and used in an IFB such as the redox flow battery cell 18 of FIG. 1. At a first step 202 in the flow diagram 200, a carbon fiber sheet 204 may be a non-limiting example of the flexible substrate 708 of FIG. 7 and used as a base layer. The carbon fiber sheet 204 may be a commercially available, off-the-shelf substrate imbedded with resin, the resin allowing the carbon fiber sheet 204 to act as an electrolyte-impermeable barrier. The resin may provide an electrically insulating component of the substrate 708 while the carbon fiber provides electrically conductive channels through the substrate 708. The carbon fiber sheet 204 may be prepregnated with high surface area carbon particles at a second step 206.

In other examples, the carbon fiber sheet 204 may instead be an impermeable metal sheet, providing both impermeability to electrolyte flow and conductivity. The metal sheet may be formed from a thin sheet of titanium, iron, stainless steel, or a precious metal. Alternatively, the metal sheet may be formed from a mesh of any of the metals listed above and filled with the resin to block electrolyte flow therethrough. By fabricating the metal sheet from a thin sheet of a metallic material or a metallic mesh, electrical conductivity and structural support is afforded to the bipolar plate 205 with reduced cost compared to the resin-imbedded carbon fiber sheet 204.

Prepregnation of the carbon fiber sheet 204 (or metallic mesh) is achieved by coating an upper face 203 of the carbon fiber sheet 204 with a layer of carbon particles to form a carbon powder coat 208. The carbon powder coat 208 is a negative electrode, e.g., the negative electrode 26 of FIG. 1, acting as a surface for $Fe^0$ plating during charging of the IFB. As such, the carbon powder coat 208 provides a surface structure to a negative side of the bipolar plate 205 that is conducive to deposition of iron metal onto the carbon powder coat 208.

The carbon powder coat 208 may be applied to the upper face 203 of the carbon fiber sheet 204 by various methods. For example, the high surface area carbon particles may be suspended in an organic solvent such as methyl ethyl ketone to form an ink with a carbon concentration of 2 wt %. The ink may be spray coated, doctor-bladed, or screen printed onto the carbon fiber sheet 204 to form the carbon powder coat 208 with an overall carbon content of 1 to 15 wt %.

At a third step 212 of the flow diagram 200, the carbon fiber sheet 204 with the carbon powder coat 208 may be coupled to graphite felt 214 along a bottom face 216 of the carbon fiber sheet 204, the bottom face 216 opposite of the upper face 203. In other examples, the graphite felt 214 may instead be carbon felt. The graphite felt 214 is a positive electrode, interacting with positive electrolyte to facilitate the redox reaction of equation (1). The graphite felt 214 may be thermally bonded to the bottom face 216 of the carbon fiber sheet 204 by heating the structure so that the resin imbedded in the carbon fiber sheet 204 melts. Upon melting, an upper face 218 of the graphite felt 214 is directly attached to the bottom face 216 of the carbon fiber sheet 204. The bipolar plate 205 is thus produced with the carbon fiber sheet 204 sandwiched between the negative electrode, formed from the carbon powder coat 208, and the positive electrode, formed from the graphite felt 214. The resin of the resin-imbedded carbon fiber sheet 204 may provide a non-conductive component of the bipolar plate 205 while the negative and positive electrodes provide conductive components.

Figure 3:
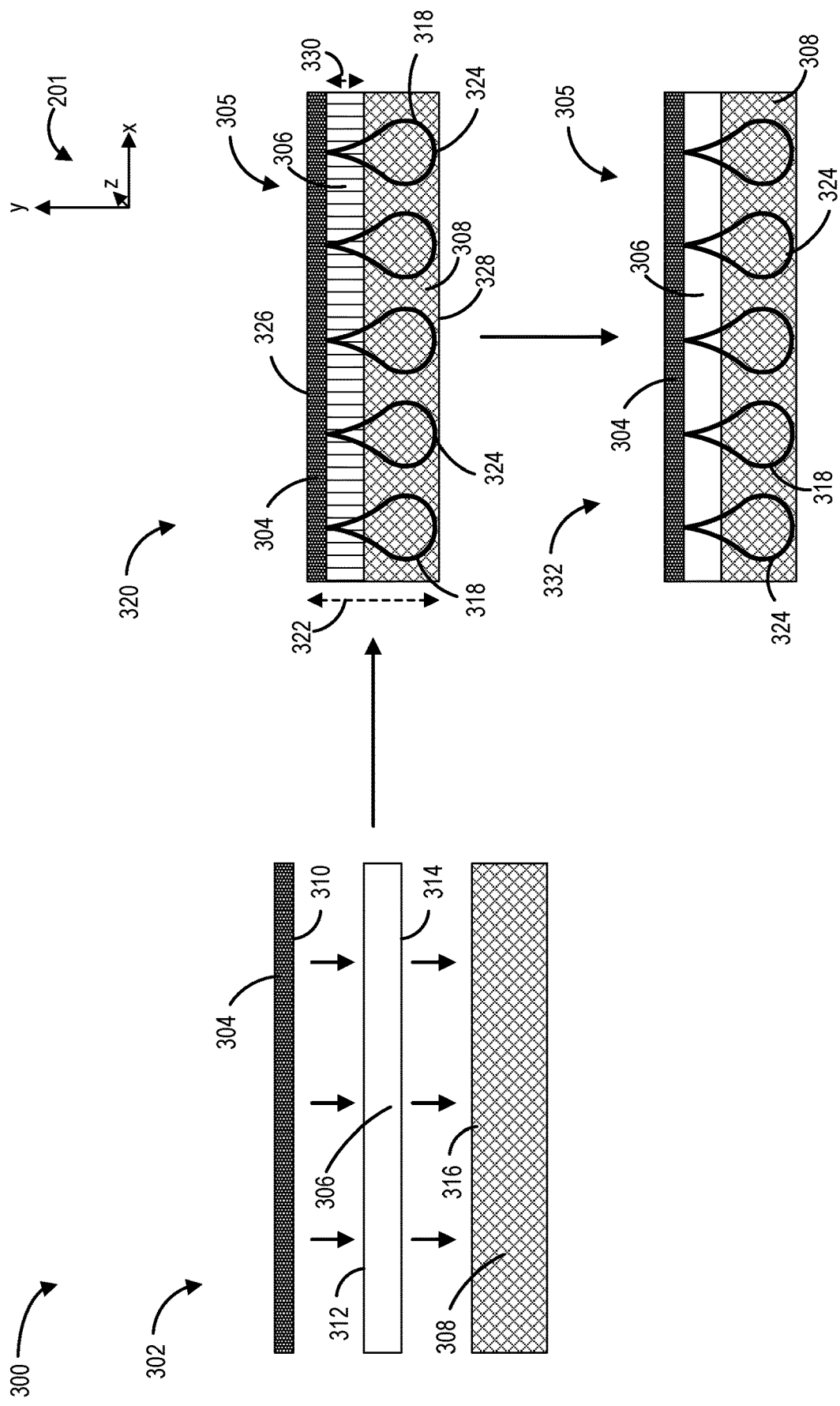
FIG. 3 shows a flow diagram of a second example of a roll-to-roll process for manufacturing a bipolar plate for the redox flow battery system.

A second example of a R2R process for manufacturing a bipolar plate 305 is illustrated in a flow diagram 300 in FIG. 3 where the bipolar plate 305, once assembled, may also be included in an IFB system. The R2R system may also be conducted on a R2R system such as the R2R system 700 of FIG. 7. The flow diagram 300 shows a first step 302 that includes stacking three layers of flexible materials which may each be commercially available: a top layer of carbon paper 304, a middle layer of thermoplastic 306 that may be the flexible substrate 708 of FIG. 7, and a bottom layer of felt 308 that may be graphite- or carbon-based. The layers may be arranged so that a bottom face 310 of the carbon paper 304 is in face-sharing contact with a top face 312 of the thermoplastic 306 and a bottom face 314 of the thermoplastic 306 is in face-sharing contact with a top face 316 of the felt 308.

In the R2R process of FIG. 3, the thermoplastic 306 may be an insulating, impervious liquid barrier, similar to the resin imbedded carbon fiber sheet 204 of FIG. 2. The carbon paper 304 may be a negative electrode of the bipolar plate 305 and the felt 308 may be a positive electrode, analogous to the carbon powder coat 208 and graphite felt 214 of FIG. 2, respectively. The three layers of the bipolar plate 305 may be sewn together using a thread 318 as shown at a second step 320 of the flow diagram 300.

At the second step 320, the thread 318, formed from a conductive material such as carbon or graphite, may maintain the three stacked layers coupled together and also provide a conductive path through the thermoplastic 306. Electron flow is thus enabled across the otherwise non-conductive thermoplastic 306. The insertion of the thread 318 through a thickness 322 of the bipolar plate 305 may be achieved by various sewing methods, including a needle punch with 1 k-10 k tow. Stitches 324 of the thread 318 may form loops through at least a portion of the thickness 322, extending from a top face 326 of the carbon paper 304 towards a bottom face 328 of the felt 308. As shown in FIG. 3, the stitches 324 may not pierce through the bottom face 328 of the felt 308 but in other examples, each stitch of the stitches 324 may extend entirely through a thickness, defined along the y-axis, of the felt 308, exiting the felt 308 at the bottom face 328 and re-entering the bottom face 328 in a continuous and sinuous manner.

The penetration of the thread 318 through the thermoplastic 306 may result in a puncturing of the thermoplastic 306, creating a plurality of apertures, or through-holes, extending through an entire depth 330 of the thermoplastic 306. A presence of through-holes may allow leakage of both positive and negative electrolytes across the thermoplastic 306. To mitigate electrolyte leakage, the bipolar plate 305 may be heat-pressed at a third step 332 of the flow diagram 300. By heat-pressing the bipolar plate 305, the thermoplastic 306 may soften and deform sufficiently to close and seal the through-holes, allowing the thermoplastic 306 to provide an electrolyte-impermeable layer between the negative and positive electrodes.

Both the processes depicted in the first and second flow diagrams 200, 300 for manufacturing a bipolar plate may be adapted as R2R processes where a flexible substrate, such as the resin imbedded carbon fiber sheet or metallic sheet 204 of FIG. 2 and the thermoplastic 306 of FIG. 3 may be positioned between a first material (e.g., the carbon powder coat 208 of FIG. 2 or the carbon paper 304 of FIG. 3) which may be coated or rolled onto a first side of the substrate. A second material (e.g., the carbon or graphite felt 214 and 308 of FIGS. 2 and 3) may be simultaneously rolled onto a second side of the substrate. The R2R processes allow larger areas of material to be produced in a shorter period of time in comparison to batch processes such as injection and compression molding. The method may be further simplified by relying on commercially available materials, as described above, thereby reducing a number of processing steps involved.

A prophetic graph 400 comparing manufacturing costs of a current state-of-the-art compression molding process versus a R2R process, such as the processes illustrated in the flow diagrams 200 and 300 of FIGS. 2 and 3, is shown in FIG. 4. A measure of a number of bipolar plates produced is given along an x-axis of the graph 400 and a unit cost per bipolar plate is provided along a y-axis. Plot 402 shows a relationship between the number of bipolar plates produced and the unit cost for the compression molding process. Plot 404 shows a relationship between the number of bipolar plates produced and the unit cost for the R2R process.

At an onset of production, e.g., left-hand side of graph 400, an initial unit cost for plot 402 is nearly double that of plot 404. As the number of bipolar plates increases, both plot 402 and 404 decrease sharply. Between 1,000,000 and 10,000,000 pieces, plot 404 remains relatively uniform, decreasing slightly per bipolar plate. Plot 402, however, shows a greater decrease, from from 1,000,000 to 10,000,000 pieces. At 10,000,000, in spite of the compression molding process becoming more cost efficient, the unit price for bipolar plate production is still double that of the R2R process. The information provided in graph 400 indicates that regardless of quantity, the R2R process results in significant savings with regards to manufacturing costs.

A first example of a method 500 for fabricating a bipolar plate via a R2R process is shown in FIG. 5. The method may be similar to the process illustrated in the flow diagram 200 of FIG. 2, allowing scaled-up production of the bipolar plate in a cost-effective manner, and performed on an R2R system, such as the R2R system 700 of FIG. 7. The R2R process may include a roll of a substrate as a starting material that is unrolled from a first roller, e.g., the first roller 704 of FIG. 7, of the R2R system and arranged so that the substrate extends from the first roller to a second roller, e.g., the second roller 706 of FIG. 7, at a second end of the R2R system. The substrate is processed as the substrate is moved from the first roller to a second roller. The final product may be reeled onto the second roller and distributed as a rolled quantity of the product, e.g., the bipolar plate.

At 502, the method includes arranging a first roll storing a substrate along a first end of the R2R system. The substrate may be a flexible material such as carbon fiber, as one example, imbedded with resin that allows the substrate to be a non-conductive layer impermeable to fluids. As another example, the substrate may be a metal sheet or a metal mesh with a resin filler. As the substrate is guided from the first roller to the second roller, the substrate is unrolled and positioned so that the substrate extends from the first roller to the second roller. The substrate is continuously unrolled as the second and/or first roller is rotated. As the substrate is unrolled and moving, a first surface, e.g., an upper surface, of the substrate is coated with a material for a negative electrode at 504.

Coating the first surface of the substrate includes applying a layer of high surface area carbon particles. The carbon particles may be suspended in a solvent as an ink and spray coated, doctor-bladed, or screen printed onto the first surface of the substrate, thereby forming the negative electrode as a layer on top of the substrate. The surface of the negative electrode, comprising a coat of the high surface carbon particles, provides a surface on which $Fe^0$ may readily plate.

The method includes, at 506, bonding a second (or bottom) surface, opposite of the first surface, of the substrate to a material for a positive electrode while the substrate is travelling from the first roller to the second roller. The material for the positive electrode, as one example, may be a graphite or carbon felt that assists in facilitating oxidation of iron when in contact with a positive electrolyte during charging of the IFB and reduction of iron when the IFB is discharging. The felt may be arranged in a roll that is fed along a direction from the first roller to the second roller and onto the second surface of the substrate as the substrate is moving so that the felt is in face-sharing contact with the bottom of the substrate. Bonding of the felt to the substrate may be achieved by heat-pressing the substrate, with the negative electrode coupled to the first surface of the substrate, and the felt coupled to the second surface. The applied heat melts the resin imbedded in the substrate and as the substrate and felt are pressed together, the melted resin adheres to the felt. The felt forms the positive electrode as a layer under the second surface of the substrate, on an opposite face from the negative electrode and the resin, once cooled, maintains the impermeability of the substrate layer within the bipolar plate. At 508, the assembled bipolar plate is collected as a roll at a second end of the R2R system on the second roller.

A second example of a method 600 for fabricating a bipolar plate via a R2R process is shown in FIG. 6 which may also be conducted on an R2R system, such as the R2R system 700 of FIG. 7. The method may be similar to the process illustrated in the flow diagram 300 of FIG. 3, allowing scaled-up production of the bipolar plate in a cost-effective manner. The R2R process may include simultaneously feeding rolls of materials from a first roller at a first end of the R2R system towards a second roller at a second end. Processing steps may be conducted as the materials are guided across the R2R system. The final product may be reeled onto the second roller, cut, and distributed as a rolled quantity of the product, e.g., the bipolar plate.

At 602, the method includes arranging rolls of a first, second, and third material along the first end of the R2R system. The first material may be a top layer that forms a negative electrode. For example, the first material may be carbon paper that provides a suitable surface for plating of iron metal during charging of the IFB. The second material, forming a middle layer, may be a thermoplastic that is non-conductive and impermeable to fluids. The third material may be a bottom layer that forms a positive electrode. The third material may be a carbon or graphite felt assisting in facilitating oxidation of iron when in contact with a positive electrolyte during charging of the IFB is charging and reduction of iron during discharging of the IFB. The rolls may be positioned according to a desired order of stacking of layers, e.g., the roll of the first material is above the roll of the second material and the roll of the third material is below the roll of the second material. The second material may unrolled and guided so that the second material extends across the first and second rollers.

At 604 the second material is steered towards the second roller and the second end of the R2R system by rotation of the second roller and/or first roller. As the second material is moving, the first material is unrolled and guided onto an upper surface of the second material and the third material is simultaneously unrolled and guided onto a lower surface of the second material, resulting in a stacked configuration of the three materials. At 606, the method includes sewing the layers of the bipolar plate assembly while the stacked materials are moving from the first roller to the second roller so that the layers are coupled and secured to one another, forming a unitary sheet. The layers may be sewn using a conductive thread, such as, for example, a carbon or graphite thread to enable transmission of electron flow through the thermoplastic. The thread may pierce through a top face of the top layer, through the middle layer of thermoplastic, and penetrate through at least a portion of a thickness of the bottom layer so that stitches formed by the thread do not puncture through a bottom face of the bottom layer of the bipolar plate. The thread may be inserted into the bipolar plate so that the stitches each form a loop within a thickness of the bipolar plate, as shown by the thread 318 of FIG. 3.

The stacked layers of the bipolar plate assembly are hot-pressed together at 608. The applied heat induces melting of the thermoplastic so that the thermoplastic seals around apertures extending through a thickness of the thermoplastic created by penetration of the thread. The impermeability of the thermoplastic to fluids is thus maintained. In addition, melting and subsequent solidification of the thermoplastic while pressed against the top and bottom layers, bonds the first material to an upper surface of the thermoplastic, forming the negative electrode, and bonds the third material to a lower surface of the thermoplastic, forming the positive electrode. The assembled bipolar plate, with the thermoplastic sandwiched between the negative and positive electrodes, is collected onto the second roller at the second end of the R2R system and cut so that the rolled bipolar plate may be transported and distributed.

In addition to a bipolar plate, a power module of an IFB may also include a membrane separator, e.g., separator 24 of FIG. 1, arranged in a battery cell, such as the battery cell 18 of FIG. 1, between a negative electrolyte compartment and a positive electrolyte compartment. The separator may be a barrier to free exchange of electrolyte constituents between the negative and positive sides of the cell. More specifically, in an IFB, the separator blocks flow of $Fe^{3+}$ and $FeCl_3$ from the positive side of the cell to the negative side where $Fe^{3+}$ may acquire electrons, resulting in reduction of $Fe^{3+}$ to $Fe^{2+}$, and decreasing an efficiency of the IFB. Other ions, such as $H^+$, may be exchanged across the separator to maintain a chemical and charge balance across the cell.

The separator may have a combination of UHMWPE and silica as a base membrane that is coated with an ionomer, such as perfluorosufonate. In such separators, the ionomer coating may be expensive and drive up an overall cost of the IFB. In order to decrease costs, a different approach enabling ion selectivity of the separator may be desirable.

One alternative may include depositing a cross-linked polymer network within pores of the membrane separator from a cross-linked polymer gel (CPG). The CPG may include functional groups, such as sulfonic acid or amine groups, which may interact with cationic constituents in electrolyte. Examples of monomers that may be used as building blocks for the polymer network are shown in FIG. 8.

A first monomer 802 that may be used in a CPG to form a polymer network in pores of a membrane separator of an IFB may be an acrylamide monomer. The first monomer 802 may have an amide moiety and an ion selectivity of the first monomer 802 may rely on an electron-donating property of the nitrogen to enable cross-linking and polymerization. Carbonyl groups on the polymer may interact with targeted ionic species in an electrolyte. The interaction transports the ionic species across the membrane by ion exchange, thus allowing certain ionic species to flow between sides of the separator while inhibiting flow of other species.

Another example of a monomer that may provide ion selectivity in the separator is shown by a second monomer 804. The second monomer 804 may be 2-acrylamido-2-methylpropane sulfonic acid (AMPS). A backbone of a polymer formed by AMPS includes carbon, nitrogen, and sulfur-based functional groups, imparting the polymer network formed by the second monomer 804 with an ion selectivity that may be different from an ion selectivity of a polymer network based on the first monomer 802. Similarly, a third monomer 806, shown as a sodium 4-vinyl benzene sulfonate salt, may form a polymer network with different electronic properties than the first monomer 802 or second monomer 804 due to a presence of benzene rings in a polymer framework formed from the third monomer 806. Additionally volumes occupied by each type of cross-linked polymer network based on the first, second and third monomers 802, 804, and 806, may vary due to differences in rigidity and molecular size of each monomer. For example, the first monomer 802, with a shorter chain of carbon and nitrogen than either the second monomer 804 or the third monomer 806 may be suited to a membrane with small pore size relative to a membrane to which the much longer second monomer 804 may be adapted.

It will be appreciated that the examples of monomers that may be used to generate cross-linked polymer networks shown in FIG. 8 are non-limiting examples. Numerous other monomers with various functional groups, length of backbone, and quantity of functional groups per building block have been envisioned.

The monomer for forming the polymer network to provide ion selectivity in the membrane separator may be chosen based on various properties of the monomer. For example, the monomer may be nominated as a result of the conditions under which the monomer may polymerize and cure to form a resin. An electrical resistance inherent to the monomer compound, durability, selectivity towards ferric ions, ionic conductivity, and resistance to fouling may all be factors in choosing the CPG for the cross-linked polymer network.

Incorporation of the CPG into pores of the membrane separator may include precipitating silica using a processing oil onto the UHMWPE. The separator may also include small amounts of residual oil which may provide a barrier to oxidation as well as carbon black, additional antioxidants, and metal stearate as a lubricant. The membrane may be exposed to a dilute (≤10 wt %) solution of the monomer. The dilution of the monomer solution may decrease a likelihood of augmented electrical resistivity of the membrane, resulting from precipitation of solid material in the membrane pores.

Cross-linking and polymerization of the monomer may be initiated by chemical and/or thermal activation, forming the polymer network within the pores of the membrane. Choice of monomer used may be based on physical conditions specific to the monomer that leads to polymerization and curing of the resultant polymer network to produce a resin. The membrane separator, with pores containing the resin, may be fabricated as a continuous sheet by a calendering process. A calendering step of the process may allow a surface of the separator to be molded with a desired texture or pattern. For example, the surface of the separator that is in contact with a negative electrolyte may be imprinted with ribs along the surface during the calendering step.

The ribs molded onto the surface of the separator may replace a negative spacer in the IFB. The negative spacer is included in the battery cell between the separator and a negative electrode to define a distance between the separator and negative electrode as well as to control a pattern of electrolyte flow across the negative electrode and to clear hydrogen bubbles. During charging of the IFB, hydrogen ($H_2$) gas may be generated within the negative electrode compartment, forming gas bubbles. The bubbles may adhere to surfaces of the negative electrode, blocking reaction sites on the electrode for iron plating and decreasing battery efficiency. By defining flow channels along the negative electrode surface, the negative electrolyte may be guided to flow along the surface following paths which promote removal of $H_2$ bubbles from the surface. The $H_2$ gas may be channeled to a storage tank storing negative electrolyte and collected in a head space of the tank, e.g., the head space 92 of storage tank 110 of FIG. 1.

By molding ribs in the surface of the separator, the negative spacer is integrated into the separator, reducing manufacturing costs by decreasing a number of components to be individually fabricated. The calendering process may allow a variety of rib patterns to be molded into the membrane separator. Examples of different rib patterns that may be achieved by molding are shown in FIG. 9.

A first separator surface 902, a second separator surface 904, a third separator surface 906, and a fourth separator surface 908 is depicted in FIG. 9. Each separator surface has a rib pattern that includes a plurality of ribs, each rib of the plurality of ribs separated from adjacent ribs by a valley of a plurality of valleys. Each rib may be a raised ridge, extending along the positive z-axis away from a surface of the separator surface and each valley may extend in an opposite direction, along the negative z-axis. Each rib pattern presents a variation in an alignment or shape of the plurality of ribs and the plurality of valleys. Each rib of the plurality of ribs may have a uniform width, measured along the x-axis and may be spaced away from adjacent ribs by uniform widths, defined along the x-axis, of each valley of the plurality of valleys. In other words, the plurality of valleys have similar overall shape as the plurality of ribs.

A separator adapted with any of the first, second, third, and fourth separator surfaces 902, 904, 906, and 908, may be positioned proximate to a negative electrode so that the ribbed separator surfaces are in contact with a surface of the negative electrode or placed so that the surface of the negative electrode is spaced away from the ribbed separator surface by a small distance. A shape of the plurality of ribs of the separator surface may influence a flow path of negative electrolyte along the separator surface.

In the first separator surface 902, a first set of ribs 910, interspaced with a first set of valleys 912, may extend linearly along a length 914 of the first separator surface 902, where the length 914 of the first separator surface 902 is also a length 914 of the second, third, and fourth separator surfaces 904, 906, 908. The length 914 may be parallel with the y-axis and perpendicular to a width of first set of valleys 912 as well as a width of the first set of ribs 910. The width of the first set of ribs 910 may be narrower than the width of the first set of valleys 912. The first set of ribs 910 and first set of valleys 912 may be arranged at an angle, such as 15 degrees, relative to the y-axis.

The second separator surface 904 may have a second set of ribs 916 and a second set of valleys 918 with similar widths, defined along the x-axis, to the widths of the first set of ribs 910 and first set of valleys 912 of the first separator surface 904. However, rather than extending linearly along the length 914 at an angle to the y-axis, the second set of ribs 916 and second set of valley 918 have a curving, sinuous shape. In contrast, a third set of ribs 920 and a third set of valleys 922 of the third separator surface 906 are aligned linearly and parallel with the y-axis along the length 914 of the third separator surface 906. Widths of the third set of ribs 920 and third set of valleys 922 may be similar to one another and both narrower than the widths of the first and second sets of ribs 910, 916 and the widths of the first and second sets of valleys 912 and 918, respectively. As a result the third set of ribs 920 may be more densely spaced than the first or second sets of ribs 910, 916, with narrower flow channels as defined by the third set of valleys 922.

The fourth separator surface 908 may have a fourth set of ribs 924 and fourth set of valleys 926 extending linearly along the length 914 of the fourth separator surface 908 at an angle to the y-axis, similar to the first set of ribs and valleys 910, 912 of the first separator surface 902. Widths of the fourth set of ribs 924 may be wider than widths of the first, second and third sets of ribs 910, 916, and 920, and similar to widths of the fourth set of valleys 926. A depth of the fourth set of ribs 924, measured along the x-axis, may be defined by a distance between a lowest point of the each valley of the fourth set of valleys 926 and a highest point of each rib of the fourth set of ribs 924, along the z-axis. The depth of the fourth set of ribs 924 may be greater than a depth of each of the first, second and third sets of ribs 910, 916, 920 also measured along the z-axis.

By modifying a geometry of the ribs and valleys of the membrane separator surface, flow of negative electrolyte between the separator and negative electrode and against a surface of the negative electrode may be moderated. The extension of the ribs and valleys along the length of the separator surface may guide flow along a direction parallel with the y-axis, and may encourage release of the bubbles to float to an upper region of an electrode compartment where accumulated gas may be siphoned to an external electrolyte storage tank.

Varying an angle of the ribs molded into the separator surface, relative to the y-axis, may allow electrolyte flow to create friction against the surface of the negative electrode in a direction that generates turbulent flow between the negative electrolyte and an alignment of pores in the separator. Configuring the ribs with a sinusoidal shape, such as the second separator surface 904, may increase turbulence in the flow of negative electrolyte, increasing a likelihood that $H_2$ bubbles are disturbed and carried along a length of the separator. Furthermore increasing or decreasing a depth of the ribs may adjust a flow velocity of negative electrolyte. Thus the geometry of the ribs and valleys may be optimized to product a desired flow pattern of negative electrolyte against the negative electrode. It will be appreciated that numerous variations in geometry of the ribs and valleys of the separator may be implemented without departing from the scope of the present disclosure.

Fabrication of a separator for an IFB with molded ribs and configured with a polymer network for ion selectivity may be achieved by a cost-efficient method such as a calendering process. An example of a calendering system 1000 that may be used to manufacture the separator is illustrated in a schematic diagram in FIG. 10. The calendering system 1000 may be an in-line system with a series of steps and treatments applied sequentially to a material. A first end 1002 of the system 1000 may include a reservoir 1004 coupled to a co-rotating twin-screw extruder 1006. The reservoir 1004 may provide an inlet to the extruder 1006 for materials forming the separator to enter the extruder 1006.

In one example, a mixture of UHMWPE, silica, a plasticizer such as naphthenic oil, as well as minor amounts of carbon black, antioxidant, and calcium stearate, may be added to the reservoir 1004. An amount and a type of silica used may affect an electrical resistivity of the separator. For example, the resistance is dependent on a combination of resistivity of an electrolyte, a thickness of the separator, a tortuosity of a pore path through the separator, and a porosity of the separator. Increasing the porosity of the separator decreases the tortuosity of the pore path, thereby decreasing resistivity of the separator. By increasing a proportion of silica and using silica with high oil absorption, an increase in separator porosity may be attained. A porosity of at least 75% may be desirable to provide sufficiently large pore volume to maintain low separator resistivity and sufficiently large pore surface areas to deposit cross-linked polymer gel (CPG)-derived polymer networks for ion selectivity.

An amount of plasticizer added to the mixture may also affect the pore volume of the separator. The plasticizer may be absorbed by the silica and occupy spaces between submicron fibrils of the separator membrane structure. Upon extraction by solvent, described further below, removal of the plasticizer forms the voids, or pores. Increasing both the amount of silica and amount of naphthenic oil may increase overall porosity and tortuosity of the separator.

The mixture may be fed to the extruder 1006 from the reservoir 1004 and heated and compounded in the extruder 1006 so that the UHMWPE is dissolved in the oil, fully enveloping the silica. The plasticized mixture may be ejected onto a belt 1008 and extruded through a flat sheet die 1010, in a direction indicated by arrows 1012, to form a sheet. The sheet travels to a set of calender rolls 1014 that includes a molding roll 1016 configured with an outer surface that imprints a desired texture or pattern, such as the examples of ribs molded into the separator surfaces of FIG. 9, onto a surface of the sheet as the sheet passes through the set of calender rolls. Ribs are molded onto the surface of the sheet during contact with the molding roll 1016. The sheet is also cooled and pressed to a uniform thickness as the sheet is fed through the set of calender rolls 1014.

The cooled and molded sheet is submerged in a solvent bath 1018 to remove most of the plasticizer from pores of the sheet. The sheet is removed from the solvent bath 1018, dried and delivered to a cross-linked polymer gel (CPG) bath 1020 storing a dilute solution of the CPG dissolved in a solvent. The CPG may be derived from a variety of monomers, such as the examples of monomers shown in FIG. 8, each type of monomer adapted to interact with select ions. The sheet is removed from the CPG bath 1020 and treated at a curing apparatus 1024.

In one example, a chemical activator may be added to the sheet by spraying, coating or some other method of applying the chemical activator directly to the sheet at the curing apparatus 1024. The chemical activator interacts with the dilute solution of the CPG stored in pores of the membrane, inducing cross-linking and polymerization to form a polymer network. In another example, polymerization may be thermally initiated and the sheet may be heated at the curing apparatus 1024.

The polymer network within the pores of the membrane may be cured by heating the sheet or exposing the sheet to UV light for a period of time at the curing apparatus 1024. Upon completion of curing, the polymer network forms a resin, producing the completed membrane separator. The separator and may be collected by winding the sheet onto a roll 1026 at a second end 1028 of the calendering process. The membrane separator may be transported and stored as a roll. Alternatively, the sheet may be immediately cut to desired dimensions and processed further for use in a battery system. Additional processing may include flattening, densifying, or slicing off the molded ribs along border areas of the separator so that the separator may be sealed within a cell stack.

An example of a method 1100 for manufacturing a membrane separator for an IFB is shown in FIG. 11. The method 1100 may be performed using a calendering system such as the calendering system 1000 of FIG. 10. The membrane separator may be a component in a battery cell, e.g., the separator 24 of the battery cell 18 in FIG. 1, of the IFB that divides a chamber of the battery cell and separates a positive electrolyte, stored on one side of the separator, from a negative electrolyte, stored on an opposite side of the separator from the positive electrolyte. The separator may be configured to allow exchange of select ions across the membrane while maintaining low electrical resistivity by implementation as a relatively thin wall of material with a polymer network integrated into pores of the separator. A negative spacer, defining a distance between the separator and a negative electrode immersed in the negative electrolyte and also guiding flow of negative electrolyte along a surface of the negative electrode, may be molded into a surface of the separator in contact with the negative electrolyte. The negative spacer may assist in removal of gas bubbles, formed during battery charging, from the surface of the negative electrolyte and may be directly imprinted into the surface of the separator, formed from a same material as the separator, and produced as a unitary, continuous sheet.

At 1102, the method includes adding chemical ingredients of the separator to an extruder of the calendering system. The extruder may be a twin-screw extruder, such as the extruder 1006 of FIG. 10, coupled to a reservoir. The chemicals may be added to the extruder through the reservoir and may include a UHMWPE to form a base membrane for the separator, silica and a plasticizer to create pores in the membrane, and other minor ingredients such as carbon black, an antioxidant, and calcium stearate. Rotation of the twin-screw extruder mixes and compounds the chemicals while heating at 1104.

The chemical mixture is extruded onto a conveyor belt and passed through a flat sheet die at 1106. The mixture emerges from the flat sheet die as a continuous sheet. At 1108, the method includes guiding the sheet through a set of calendering rolls. At least one roll of the set of calendering rolls may be adapted with an outer surface that molds a pattern or texture onto a surface of the sheet, creating ribs along the surface, such as the various examples of ribs shown in FIG. 9. The ribs may be configured with a geometry that results in a desired path of negative electrolyte flow along the negative electrode surface. In addition to molding ribs onto the surface of the sheet, the sheet is also cooled and pressed to a uniform thickness by passing the sheet through the set of the calendering rolls.

The plasticizer may be removed at 1110 of the method. Removing the plasticizer may be achieved by submerging the molded sheet in a first bath containing a solvent. Exposure to solvent may extract most of the plasticizer absorbed by the silica within pores of the separator, with a residual amount of plasticizer remaining to provide a barrier to oxidation. The sheet is removed from the solvent bath and dried. The dried sheet may be submerged in a second bath at 1112 containing a dilute solution of a CPG. The CPG may comprise repeating units of a monomer, such as the first, second, and third monomers 802, 804, 806 depicted in FIG. 8, with functional groups that allow selective interaction with ions. By submerging the sheet in the dilute CPG solution, pores of the separator may be infiltrated with the CPG. The sheet is removed from the second bath and delivered to a curing station.

At 1114, the method includes curing the CPG stored within the pores of the separator by exposing the CPG solution to a chemical activator or to heat. Crosslinking and polymerization is initiated in the pores, forming the ion selective polymer network. Following polymerization, the polymer network may be cured at the curing station by heating the sheet. Alternatively, the polymer network may be cured by exposure to UV light. Curing the polymer network results in a transformation into a resin, completing the fabrication of the separator.

At a terminal end of the calendering system, the separator may be collected at 1118 of the method for subsequent implementation into a device, such as the IFB. In one example, collection of the separator may include winding the sheet onto a roll, cutting the sheet and transporting the roll to be distributed and/or stored. In another example, the separator sheet may be immediately cut to desired dimensions and further processed for incorporation into the IFB.

In this way, a bipolar plate for a redox flow battery may be assembled via a cost-effective, high throughput method. The bipolar plate may be produced using roll-to-roll (R2R) processing techniques and may include bonding a first material, configured to form a negative electrode, to a first face of a flexible substrate and a bonding a second material, configured to form a positive electrode, to a second face of the substrate, the second face opposite of the first face. The substrate may be an electrically non-conductive layer that separates positive electrolyte from negative electrolyte in a battery cell by acting as an impermeable barrier. The negative electrode, in contact with the negative electrolyte, may be adapted to provide a surface favorable for plating of iron metal during battery charging. The positive electrode, in contact with the positive electrolyte, may be adapted to readily shuttle electrons to facilitate an iron redox reaction during charging and discharging of the battery. Expenses arising from a number of processing steps and amount of raw materials to produce repeating components, such as the bipolar plate and electrodes, is greatly reduced. In addition, the R2R method of fabrication decreases processing times relative to conventional batch methods.

In one embodiment, a method includes arranging a flexible substrate between a first roller and a second roller, moving the flexible substrate in a direction from the first roller towards the second roller, coupling a top surface of the flexible substrate with a first conductive material as the flexible substrate is moving, coupling a bottom surface of the flexible substrate with a second material as the flexible substrate is moving, bonding the first conductive material and the second conductive material to the flexible layer and forming the bipolar plate, the flexible substrate sandwiched between the first conductive material and the second conductive material, as the flexible substrate is moving from the first roller to the second roller, and collecting the bipolar plate onto the second roller. In a first example of the method, coupling the first conductive material to the flexible substrate includes applying a layer of the first conductive material to the top surface of the non-conductive substrate by one of spin-coating, doctor-blading, or screen printing. A second example of the method optionally includes the first method, and further includes, wherein coupling the first conductive material to the flexible substrate includes unreeling a roll of the first conductive material onto the top surface of the flexible substrate. A third example of the method optionally includes one or more of the first and second methods, and further includes, wherein coupling the second conductive material to the flexible substrate includes unreeling a roll of the second conductive material onto the bottom surface of the flexible substrate. A fourth example of the method optionally includes one or more of the first through third examples, and further includes, wherein bonding the first and second conductive materials to the flexible substrate includes heating and pressing the first and second conductive materials against the top and bottom surfaces, respectively, of the flexible substrate. A fifth example of the method optionally includes one or more of the first through fourth examples, and further includes, wherein bonding the bipolar plate includes sewing the bipolar plate with a thread formed from a conductive material. A sixth example of the method optionally includes one or more of the first through fifth examples, and further includes, inserting stitches of the thread through an entire thickness of each of the first conductive material and the flexible substrate, and through a portion of a thickness of the second conductive material, from a top face of the bipolar plate towards a bottom face of the bipolar plate.

In another embodiment, a redox flow battery system includes a battery cell including, a bipolar plate assembly including a fluid-impermeable layer sandwiched between a negative electrode and a positive electrode, a negative electrolyte in contact with the negative electrode, and a positive electrolyte in contact with the positive electrode. In a first example of the system, a membrane separator is arranged between the negative electrode and a positive electrode of an adjacent battery cell, on an opposite side of the negative electrode from the bipolar plate. A second example of the system optionally includes the first example, and further includes, wherein the fluid-impermeable layer is formed from carbon fiber imbedded with resin and separates the negative electrolyte from the positive electrolyte within the battery cell. A third example of the system optionally includes one or more of the first and second examples, and further includes, wherein the fluid-impermeable layer is formed from metal and configured to conduct electricity and maintain a rigidity of the bipolar plate. A fourth example of the system optionally includes one or more of the first through third examples, and further includes, wherein the negative electrode is formed from a layer of high surface area carbon particles deposited onto a first surface of the fluid-impermeable layer. A fifth example of the system optionally includes one or more of the first through fourth examples, and further includes, wherein the positive electrode is formed from a carbon or graphite felt heat-pressed onto a second surface of the fluid-impermeable layer, the second surface opposite of the first surface. A sixth example of the system optionally includes one or more of the first through fifth examples, and further includes, wherein the fluid-impermeable layer is formed from thermoplastic and separates the negative electrolyte from the positive electrolyte within the battery cell. A seventh example of the system optionally includes one or more of the first through sixth examples, and further includes, wherein the negative electrode is formed from a carbon sheet coupled to a first surface of the thermoplastic. An eighth example of the system optionally includes one or more of the first through seventh examples, and further includes, wherein the positive electrode is formed from a carbon or graphite felt coupled to a second surface of the thermoplastic, the second surface opposite of the first surface. A ninth example of the system optionally includes one or more of the first through eighth examples, and further includes, a conductive thread penetrating through a thickness of the bipolar plate and maintaining the coupling of the negative electrode to the first surface of the thermoplastic and the coupling of the positive electrode to the second surface of the thermoplastic and wherein the thermoplastic is melted and sealed around portions of the conductive thread extending through a thickness of the thermoplastic. A tenth example of the system optionally includes one or more of the first through eighth examples, and further includes, wherein the membrane separator is coupled to the negative electrode on a first side of the membrane separator and coupled to the positive electrode of the adjacent battery cell on a second side of the membrane separator, the second side opposite of the first side.

In yet another embodiment, a method includes fabricating a bipolar plate assembly, the bipolar plate assembly including a non-conductive substrate coupled to a negative electrode on a first side and coupled to a positive electrode on a second, opposite side, the negative and positive electrodes spaced apart by a thickness of the non-conductive substrate. In a first example of the method, the bipolar plate assembly is fabricated by a roll-to-roll process.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for fabricating a bipolar plate, comprising:
arranging a flexible substrate between a first roller and a second roller;
moving the flexible substrate in a direction from the first roller towards the second roller;
coupling a top surface of the flexible substrate with a first conductive material as the flexible substrate is moving;
coupling a bottom surface of the flexible substrate with a second material as the flexible substrate is moving;
bonding the first conductive material and a second conductive material to the flexible substrate and forming the bipolar plate, the flexible substrate sandwiched between the first conductive material and the second conductive material, as the flexible substrate is moving from the first roller to the second roller, wherein the bonding includes sewing the bipolar plate with a thread formed from a conductive material; and
collecting the bipolar plate onto the second roller.

2. The method of claim 1, wherein coupling the first conductive material to the flexible substrate includes applying a layer of the first conductive material to the top surface of a non-conductive substrate by one of spin-coating, doctor-blading, or screen printing.

3. The method of claim 1, wherein coupling the first conductive material to the flexible substrate includes unreeling a roll of the first conductive material onto the top surface of the flexible substrate.

4. The method of claim 1, wherein coupling the second conductive material to the flexible substrate includes unreeling a roll of the second conductive material onto the bottom surface of the flexible substrate.

5. The method of claim 1, wherein bonding the first and second conductive materials to the flexible substrate includes heating and pressing the first and second conductive materials against the top and bottom surfaces, respectively, of the flexible substrate.

6. The method of claim 1, further comprising inserting stitches of the thread through an entire thickness of each of the first conductive material and the flexible substrate, and through a portion of a thickness of the second conductive material, from a top face of the bipolar plate towards a bottom face of the bipolar plate.

7. A method for manufacturing a redox flow battery, comprising:
fabricating a bipolar plate assembly, the bipolar plate assembly including a non-conductive substrate coupled to a negative electrode on a first side and coupled to a positive electrode on a second opposite side, the negative and positive electrodes spaced apart by a thickness of the non-conductive substrate; and
sewing the bipolar plate assembly with a thread formed from a conductive material.

8. The method of claim 7, further comprising fabricating the bipolar plate assembly by a roll-to-roll process.

9. The method of claim 1, further comprising hot-pressing the bipolar plate after the sewing of the bipolar plate.

10. The method of claim 1, wherein the thread punctures one outer surface of the bipolar plate but does not puncture an opposite outer surface of the bipolar plate.

11. The method of claim 1, wherein the thread punctures both sides of the bipolar plate.

12. The method of claim 11, further comprising hot-pressing the bipolar plate assembly after the sewing of the bipolar plate.

13. The method of claim 1, wherein stitches of the thread form a loop within a thickness of the bipolar plate.

14. The method of claim 1, wherein the thread is comprised of carbon or graphite.

15. The method of claim 7, further comprising hot-pressing the bipolar plate assembly after the sewing of the bipolar plate assembly.

16. The method of claim 7, wherein the thread punctures one outer surface of the negative electrode but does not puncture an opposite outer surface of the positive electrode.

17. The method of claim 7, the thread punctures an exterior of each of the positive electrode and the negative electrode.

18. The method of claim 17, further comprising hot-pressing the bipolar plate assembly to melt the non-conductive substrate after the sewing of the bipolar plate assembly.

19. The method of claim 1, wherein stitches of the thread form a loop within a thickness of the bipolar plate assembly and the stitches extend within each layer of the bipolar plate assembly.

20. The method of claim 1, wherein the thread is comprised of carbon or graphite.

* * * * *